(12) United States Patent
Simmons et al.

(10) Patent No.: US 12,464,861 B2
(45) Date of Patent: Nov. 4, 2025

(54) SYSTEMS, DEVICES, ARTICLES AND METHODS INCLUDING LUMINESCENT LOCAL DEFECTS IN SEMICONDUCTORS WITH LOCAL INFORMATION STATES

(71) Applicant: PHOTONIC INC., Burnaby (CA)

(72) Inventors: Stephanie Simmons, Burnaby (CA); Michael L. W. Thewalt, Burnaby (CA)

(73) Assignee: PHOTONIC INC., Coquitlam (CA)

( * ) Notice: Subject to any disclaimer, the term of this patent is extended or adjusted under 35 U.S.C. 154(b) by 1322 days.

(21) Appl. No.: 17/058,597

(22) PCT Filed: May 24, 2019

(86) PCT No.: PCT/IB2019/054312
§ 371 (c)(1),
(2) Date: Nov. 24, 2020

(87) PCT Pub. No.: WO2019/224789
PCT Pub. Date: Nov. 28, 2019

(65) Prior Publication Data
US 2021/0142203 A1    May 13, 2021

Related U.S. Application Data

(60) Provisional application No. 62/703,689, filed on Jul. 26, 2018, provisional application No. 62/676,023, filed on May 24, 2018.

(51) Int. Cl.
*G06N 10/40* (2022.01)
*B82Y 10/00* (2011.01)
(Continued)

(52) U.S. Cl.
CPC ......... *H10H 20/8215* (2025.01); *G06N 10/40* (2022.01); *B82Y 10/00* (2013.01); *B82Y 20/00* (2013.01); *H10H 20/812* (2025.01)

(58) Field of Classification Search
CPC . H01L 21/324; H01L 21/2633; H01L 33/025; G06N 10/40; G06N 10/60; G06N 10/70
See application file for complete search history.

(56) References Cited

U.S. PATENT DOCUMENTS 7,546,000 B2    6/2009    Spillane et al.
7,664,357 B2    2/2010    Song et al.
(Continued)

FOREIGN PATENT DOCUMENTS

TW    201513390 A    4/2015
TW    201731071 A    9/2017
(Continued)

OTHER PUBLICATIONS

Lo et al. Hybrid optical-electrical detection of donor electron spins with bound excitons in silicon, Mar. 23, 2015, Nature Materials, vol. 14, pp. 490-494 (Year: 2015).*

(Continued)

*Primary Examiner* — Bumsuk Won
*Assistant Examiner* — Samanvitha Sridhar
(74) *Attorney, Agent, or Firm* — Oyen Wiggs Green & Mutala LLP

(57) ABSTRACT

A device, such as, an information processing or communications device, including a body of semiconductor material consisting principally of silicon, one or more luminescence centres disposed in the body of semiconductor material, one or more optical degrees of freedom associated with the one or more luminescence centres, and one or more local degrees of freedom associated with the one or more luminescence centres. A respective optical degree of freedom is associated with a respective luminescence centre. A respective local degree of freedom is associated with a respective luminescence centre. The one or more local degrees of freedom modify the one or more optical degrees of freedom.

15 Claims, 14 Drawing Sheets

(51) Int. Cl.
*H10H 20/81* (2025.01)
*H10H 20/812* (2025.01)
*B82Y 20/00* (2011.01)

(56) References Cited

U.S. PATENT DOCUMENTS

| | | | |
|---|---|---|---|
| 11,341,426 B2* | 5/2022 | Simmons | H01L 29/127 |
| 2011/0163291 A1 | 7/2011 | Scarsbrook et al. | |
| 2015/0354938 A1 | 12/2015 | Mower et al. | |
| 2022/0327416 A1* | 10/2022 | Simmons | H01L 29/02 |

FOREIGN PATENT DOCUMENTS

| | | |
|---|---|---|
| TW | 201802454 A | 1/2018 |
| WO | 2017089891 A1 | 6/2017 |
| WO | 2018063206 A1 | 4/2018 |

OTHER PUBLICATIONS

Safonov et al., Interstitial—Carbon Hydrogen Interaction in Silicon, Dec. 2, 1996, PRL 77, 23, pp. 4812-4815 (Year: 1996).*

Pender, Charles W., "Development of an Imaging Fourier Transform Spectrometer", May 1986, United States Air Force & Arnold Engineering Development Center (Year: 1986).*

Rohrs et al., "Fourier transform infrared absorption spectroscopy of jet-cooled radicals", Mar. 1, 1995, Rev. Sci. Instrum. 66, 2430-2441 (Year: 1995).*

Atature, M. et al., "Material platforms for spin-based photonic quantum technologies", Nature Reviews Materials, Nature Publishing Group UK, London, vol. 3, No. 5, May 2018, pp. 38-51.

Gao, W. B. et al., "Coherent manipulation, measurement and entanglement of individual solid-state spins using optical fields", Nature Photonics, vol. 9, No. 6, Jun. 2015, pp. 363-373.

Nagy, R. et al., "High-fidelity spin and optical control of single silicon-vacancy centres in silicon carbide", Nature Communications 10, Article No. 1954, Apr. 26, 2019.

Morse, K.J. et al., "A photonic platform for donor spin qubits in silicon", Science Advances, vol. 3, No. 7, Jul. 26, 2017.

Weber, J.R. et al., "Quantum computing with defects", Proceedings of the National Academy of Sciences, vol. 107, No. 19, May 2010.

Akhlaghi, M.K. et al., "Waveguide integrated superconducting single-photon detectors implemented as near-perfect absorbers of coherent radiation", Nature Communications 6: 8233, 2015.

Eisaman, M.D. et al., "Invited Review Article: Single-photon sources and detectors", Rev. Sci. Instrum. 82, 071101, 2011.

Wang, H. et al., "G-centers in irradiated silicon revisited: A screened hybrid density functional theory approach", Journal of Applied Physics 115, 183509, 2014.

Davies, G., "The optical properties of luminescence centres in silicon", Physics Reports 176: 83-188, 1989.

Hartmann, S.R. and Hahn, E.L., "Nuclear Double Resonance in the Rotating Frame", Phys. Rev. 128:2042-2053, 1962.

Di Cioccio, L. et al., "Silicon carbide on insulator formation by the Smart-Cut(R) process", Materials Science and Engineering: B46 (1997) 349-356.

* cited by examiner

– 1 –

SYSTEMS, DEVICES, ARTICLES AND METHODS INCLUDING LUMINESCENT LOCAL DEFECTS IN SEMICONDUCTORS WITH LOCAL INFORMATION STATES

TECHNICAL FIELD

The present invention relates to information processing operations with defects (e.g., localized lattice impurities or imperfections) in semiconductor material characterized by physical states modified by a local degree of freedom (e.g., spin). The defects are optically active and may be used in information processing.

BACKGROUND

Information is contained in the state of a physical system. The physical system may be a quantum system or a classical system. Systems include tangible devices such as electrical components defined on or within one or more substrates. The physical system may include one or more photons that may interact with or otherwise communicatively couple other physical components.

Crystalline solids, like semiconductors, have a regular arrangement of constituents, such as, a lattice of atoms. The lattice may have defects that can be classified by geometry, structure, chemical composition, electronic properties (e.g., ionization energy, binding energy, emission process, scattering process), and the like. Geometry classification can include zero-dimensional or point defects; one-dimensional line defects; two-dimensional area defects; and three-dimensional or volume defects. Point defects occur only at a lattice point or primarily within a unit cell distance from the lattice point. A unit cell distance defines the distances of a unit cell, the simplest repeating unit in the solid. Point defects include vacancies where a lattice site which would typically be occupied is empty, interstitial defects where an atom exists between occupied lattice sites, and substitutional defects where an impurity occupies a lattice site. Local defects are composed of combinations of point defects, such as substitutional atoms, interstitial atoms, and vacancies.

BRIEF SUMMARY

A device including a body of semiconductor material consisting principally of silicon, one or more luminescence centres disposed in the body of semiconductor material, one or more optical degrees of freedom associated with the one or more luminescence centres, and one or more local degrees of freedom associated with the one or more luminescence centres. A respective optical degree of freedom is associated with a respective luminescence centre. A respective local degree of freedom is associated with a respective luminescence centre. The one or more local degrees of freedom modify the one or more optical degrees of freedom.

An information processing system including a special information processor, an input subsystem communicatively coupled to the special information processor, at least one processor communicatively coupled to the input subsystem, and at least one tangible computer-readable storage device communicatively coupled to the at least one processor. The special information processor includes a body of semiconductor material consisting principally of silicon, and a first luminescence centre disposed in the body of semiconductor material, and a first particle associated with the first luminescence centre. The first particle includes a respective first state and a respective second state, separated by a respective optical transition modified by a local degree of freedom. The processor-executable instructions which, when executed by the at least one processor, cause the at least one processor to direct the input subsystem to manipulate the first luminescence centre to a first computational state.

An information processor substantially as described and illustrated herein.

A system including at least one processor and a quantum information processor substantially as described and illustrated herein.

A method of operation of an information processor substantially as described and illustrated herein.

A method of operation of a system including a digital computer and an analog computer substantially as described and illustrated herein.

A communication device substantially as described and illustrated herein.

BRIEF DESCRIPTION OF THE DRAWINGS

Systems, devices, articles, and methods are described in greater detail herein with reference to the following figures in which.

DETAILED DESCRIPTION

Disclosed herein are systems, devices, articles, and methods with practical application in information processing (e.g., computing, communication, quantum computing, and quantum communication). Information processing includes processing information where information is stored in the physical state of a physical (e.g., tangible) system. Communication includes transferring information from one physical system to another physical system by one or more signals which describe the physical state of a physical system. Quantum information processing includes processing information by using one or more quantum physical effects, such as, superposition, coherence, decoherence, entanglement, nonlocality, and teleportation. Some implementations of the present systems, devices, articles, and methods include, or are characterized by, two or more of the following aspects of a quantum computer: well-defined qubits, reliable state preparation, low decoherence rates, accurate quantum gate operations, multi-qubit operations, and quantum measurements. The systems, devices, articles and methods, with practical application in quantum communication and quantum computing, can interconvert states in stationary qubits (e.g., solid state) and flying qubits (e.g., photons).

Some implementations of the present systems, devices, articles, and methods include, or are characterized by, information being stored in, or manipulated via energy differences, associated with states of one or more carriers associated with (e.g., bound to, drawn from the lattice to defect) local defects in semiconductor material and where the states are modified by a local degree of freedom (e.g., spin, carrier spin). Some implementations of the present systems, devices, articles, and methods include, or are characterized by, information being stored in or manipulated by, optical transitions associated with local defects in a semiconductor material. Herein optical means of or relating to optics and/or to radiation in the electromagnetic spectrum, e.g., infrared, visible, and ultraviolet. Such defects include luminescence centres which include those with photoluminescence, an optical transition, or the like. Examples of local defects including luminescence centres are described herein below. Some implementations of the present systems, devices, articles, and methods include, or are characterized by, information being stored in local degrees of freedom associated with local defects such as spin of an associated particle (e.g., carrier, hole, electron, nucleus), valley state, charge state, configuration state, orbital state, or some degree of freedom formed by a combination thereof. Examples of local defects and luminescence centres described herein are hard to classify as shallow or deep many have neutral ground states which do not have well defined ground state energy levels so the terms shallow or deep are hard to attach.

Figure 1:
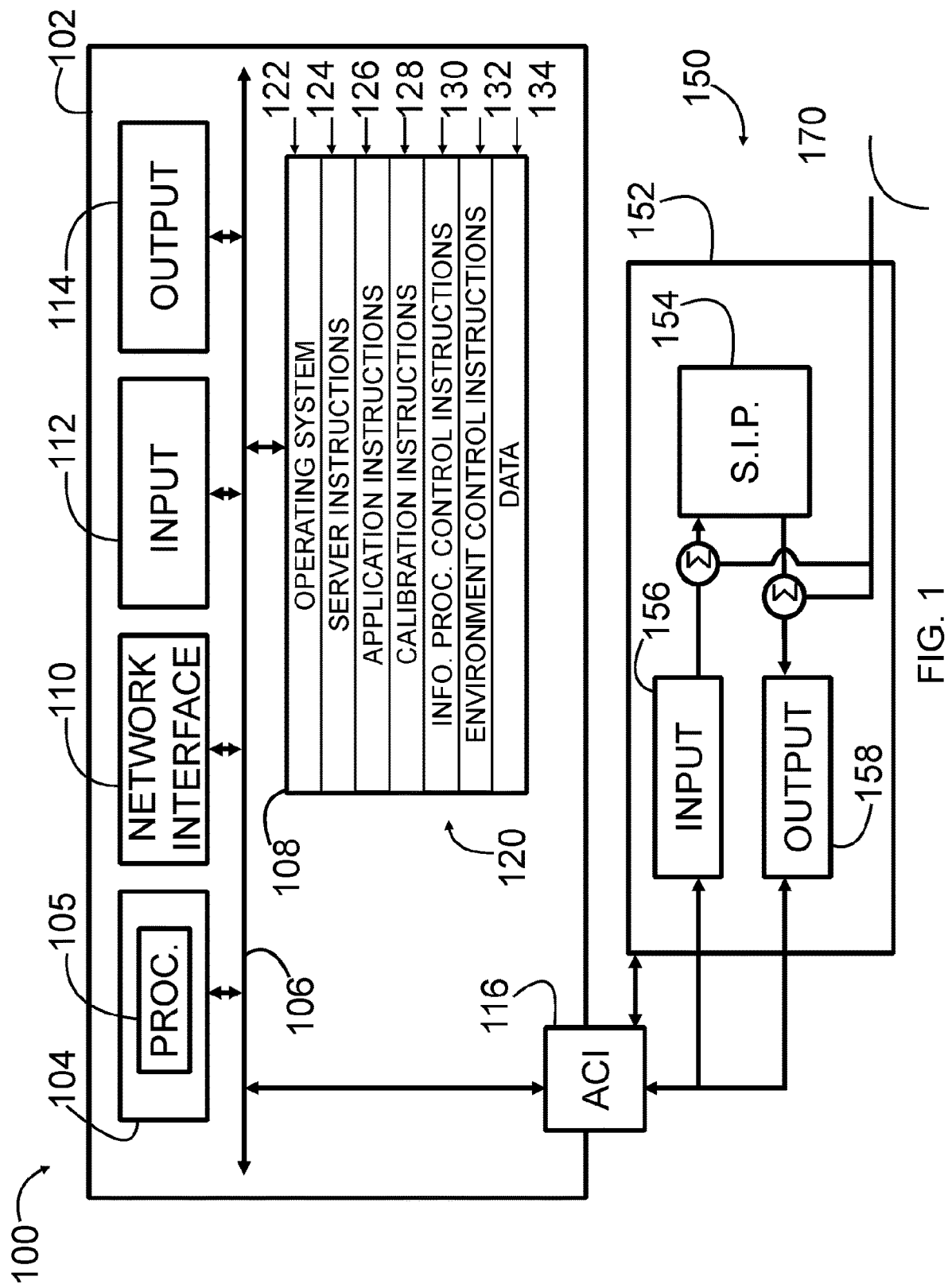
FIG. 1 is a schematic diagram illustrating a portion of a system including an information processor.

FIG. 1 illustrates a processor-based system 100 including one or more specialized devices to process information. System 100 includes a digital computer 102 that comprises a control subsystem 104. Control subsystem 104 includes at least one processor 105. Digital computer 102 includes at least one bus 106 coupled to control subsystem 104. System 100 further includes at least one non-transitory computer- and processor-readable storage device 108, and a network interface subsystem 110, both communicatively coupled to bus(es) 106. Digital computer 102 includes an operator input subsystem 112, and an output subsystem 114, communicatively coupled to the bus(es) 106. Digital computer 102 also includes an analog computer interface (AIC) subsystem 116 coupled to bus(es) 106. Bus(es) 106 may communicatively couple pairs of subsystems and/or all the subsystems in computer 102. In some implementations, some subsystems of system 100 may be omitted or combined. Some subsystem of system 100 may be remotely accessed through network interface subsystem 110.

The at least one processor 105 may be any logic processing unit, such as one or more digital processors, microprocessors, central processing units (CPUs), graphics processing units (GPUs), application-specific integrated circuits (ASICs), programmable gate arrays (PGAs), programmed logic units (PLUs), digital signal processors (DSPs), network processors (NPs), and the like.

Network interface subsystem 110 includes communication circuitry to support bidirectional communication of processor-readable data, and processor-executable instructions. Network interface subsystem 110 may employ communication protocols (e.g., FTP, HTTPS, SSH, TCP/IP, SOAP plus XML) to exchange processor-readable data, and processor-executable instructions over a network or non-network communication channel (not shown) such as, Internet, a serial connection, a parallel connection, ETHERNET®, wireless connection, fiber optic connection, combinations of the preceding, and the like.

Operator input subsystem 112 includes one or more user interface devices, such as, keyboard, pointer, number pad, touch screen, or other interface devices for a user or human operator. In some implementations, operator input subsystem 112 includes one or more sensors for digital computer 102 or analog computer 150. The one or more sensors provide information characterizing or representing the environment or internal state of digital computer 102 and/or analog computer 150. Further, output subsystem 114 includes one or user interface devices such as, display, lights, speaker, and printer.

Storage device(s) 108 include at least one nontransitory or tangible storage device. Storage device(s) 108 can, for example, include one or more volatile storage devices, for instance random access memory (RAM); and one or more non-volatile storage devices, for instance read only memory (ROM). The storage device(s) 108 may comprise solid state memory, flash memory, magnetic hard disk, optical disk, solid state disk (SSD), hard disk drive (HDD), network drive, other forms of computer- and processor-readable storage media, or a combination. A person of ordinary skill in the art will appreciate storage device(s) 108 and may be implemented in a variety of ways, such as, non-volatile storage, volatile storage, and/or a combination thereof. Further, computer systems can conflate volatile storage and non-volatile storage, for example, caches, solid-state hard drives, in-memory databases, and the like.

Storage device(s) 108 includes or stores processor-executable instructions and/or processor-readable data 120 associated with the operation of system 100. Execution of processor-executable instructions, optionally reading processor-readable data 120 causes the at least one processor 105, and/or control subsystem 104, to carry out, or cause, various methods and actions to be performed by system 100, digital computer 102, other systems or devices, or combination. For example, via network interface subsystem 110, or analog computer interface subsystem 116. Processor-executable instructions and/or processor-readable data 120 can, for example, include a basic input/output system (BIOS)(not shown), an operating system 122, peripheral drivers (not shown), server instructions 124, application instructions 126, calibration instructions 128, special information processor control instructions 130, environment control instructions 132, and data 134.

Exemplary operating system 122 includes, for example, LINUX®, and WINDOWS® operating systems. Server instructions 124 include processor-executable instructions and/or processor-readable data to interact with processor-based devices external to system 100 across a network via network interface subsystem 110. In some embodiments, processor-executable server instructions 124 include processor-executable instructions and/or processor-readable data that, when executed by a processor, schedules jobs for digital computer 102 or analog computer 150. Application instructions 126 include processor-executable instructions that, when executed, cause system 100 to perform one or more actions associated with an application, e.g., perform computations on digital computer 102 or analog computer 150.

Instructions 128 include processor-executable instructions, that, when executed by a processor (e.g., processor(s) 105) cause the processor to calibrate and store the calibrated values for analog computer 150. Components included in or on analog computer 150 could have inter-component variation in operating parameters. Components included in or on analog computer 150 could have variation in operating parameters that vary with time or vary from expected or ideal component parameters. Calibration instructions 128, when executed by a processor, allow for test and correction of these inter-component variation, temporal variation, and/or variation from expected or ideal component parameters.

Information processor control instructions 130 include processor-executable instructions that, when executed by a processor (e.g., processor(s) 105) cause the processor to control, initialize, write to, manipulate, read out, and/or otherwise send data to/from analog computer 150. Information processor control instructions 130 implement, in part, the methods described herein (e.g., with reference to FIGS. 10-14) and/or make use of input subsystems or output subsystems included in analog computer 150.

Environment control instructions 132 include processor-executable instructions and/or processor-readable data, that, when executed by a processor (e.g., processor(s) 105), cause the processor to control and monitor aspects of prescribed and possibly specialized environments for part or all of analog computer 150. Examples of environment control instructions 132 include instructions which when executed monitor and control temperature and magnetic field affecting a quantum information processor. Environment control instructions 132 could create a thermal profile (e.g., temperature values for some or all of analog computer 150 with temporal or spatial dependencies). Environment control instructions 132 implement, in part, the methods described herein, including those in, and in relation to, FIG. 10.

Data 134 may include processor-readable information or data used, obtained, created, or updated by the operation of system 100. For example, one or more logs from digital computer 102 and analog computer 150. Data 134 may include processor-readable data comprising parameters for the operation of system 100. Data 134 may include processor-readable data associated with (e.g., created by, referred to, changed by) a processor executing processor-executable instructions, such as, server instructions 124, application instructions 126, calibration instructions 128, information processor control instructions 130, and environment control instructions 132. Data 134 may include processor-readable data corresponding to local degrees of freedom associated with luminescent defects and modified by a local degree of freedom (e.g., spin), or transitions between such states. Examples of such data are shown herein at, at least, FIG. 8.

Analog computer interface (ACI) subsystem 116 includes communication circuitry that supports bidirectional communication between digital computer 102 and analog computer 150. In some implementations, the input or output from analog computer 150 is digital an intermediate state within analog computer is analog. In some implementations, analog computer interface subsystem 116 interacts with an environment subsystem 152 of analog computer 150. In some implementations, analog computer interface subsystem 116 interacts with special information processor 154 via one or more subsystems of analog computer 150 (e.g., subsystems 156 and 158). In various implementations, ACI subsystem 116 may include a waveform digitizer (e.g., an ALAZARTECH ATS9440, a 4-channel, 14 bit, 125 MS/s card, or an ALAZARTECH ATS9360, a 1-channel, 12 bit, 1.8 GS/s PCI card, card from Alazar Technologies Inc. of Pointe-Claire, QC, CA) and/or a photon detector (e.g. an ID230 NIR photon detector from ID Quantique SA, Carouge, GE, CH). Further detectors are described herein at, at least, FIG. 2.

Analog computer 150 includes an environment subsystem 152 providing a prescribed environment for special information processor or information processor 154. The environment subsystem 152 may act in response to execution of the environment control instructions 132. Aspects of a prescribed environment may include, for example, one or more of moisture, air pressure, vibration, magnetic field, temperature, and electromagnetic fields. In some implementations, environment subsystem 152 provides a low magnetic field around information processor 154. In some implementations, environment subsystem 152 provides a time invariant magnetic field around information processor 154. In some implementations, environment subsystem 152 provides a time varying or pulsed magnetic field. In some implementations, environment subsystem 152 maintains the information processor 154 at cryogenic temperatures via one or more refrigeration units, and/or cold sources. For example, information processor 154 may be maintained near 4 K. Other useful temperatures for information processor 154 include temperatures in a range from about 100 mK to about 77 K. Other useful temperatures ranges for information processor 154 include about 1.5 K to about 4 K. In some implementations, environment subsystem 152 maintains the environment around information processor 154 has a temperature of about 290 K. In some implementations, environment subsystem 152 includes vibration isolation devices including dampeners in refrigeration units. In some implementations, environment subsystem 152 provides a low moisture and constant air pressure (e.g., a stable mild vacuum) environment to information processor 154.

Special information processor 154 may be a quantum device. Quantum devices are manufactures or structures in which quantum mechanical effects are noticeable and/or dominate. Quantum devices (such as superconducting circuits and spintronic circuits) include circuits in which current transport is dominated by quantum mechanisms. Superconducting circuits use quantum physics phenomena such as tunneling and flux quantization. Spintronic circuits use the physical property of spin (e.g. electron spin) as a resource to receive, process, store, send, or output information. Quantum devices can be used for measurement instruments, in computing machinery, and the like. Examples of computing machinery include components of classical computers and quantum computers.

Information processor 154 may be a quantum information processor which includes one or more qubits or qudits, collectively qubits. A qubit or quantum bit is a logical building block of a quantum computer comparable to a binary digit in a classical digital computer. A qubit conventionally is a defined physical system having two or more discrete states called computational states. Computational states are analogous to binary states (i.e., 0 and 1) and may be labeled |0> and |1>. In some implementations, these states are the eigenstates of a sigma-Z operator (Pauli matrix operator) for the physical system. Such qubits are said to be in the Z diagonal basis and other bases may be used without loss of generality. A qubit may be in a superposition of states or linear combination, e.g., $\alpha|0\rangle+\beta|1\rangle$. Coefficients $\alpha$ and $\beta$ may be complex numbers and have the sum of their modulus sum to one. Examples of computational states are described herein, at least, with reference to FIG. 9. One or more logical operations can be performed on one or more qubits. These operations can occur at a prescribed time, (e.g., at a specified time) or at a frequency for a prescribed period. In some implementations, information processor 154 includes one of more qudits encoded by a plurality of acceptor or donor states. A qudit is a generalization of a qubit defined by first ($|0\rangle$), second ($|1\rangle$), third ($|2\rangle$) states, and perhaps further states up to the dimensionality of the qudit. In some implementations, information processor 154 includes one of more qutrits, that is, a 3-tuple version of a qubit. A person having ordinary skill in the art will appreciate that qubit may be used as a synecdoche where the species "qubit" stands for the genus "qudit".

In some implementations, information processor 154 includes one or more devices or subsystems to perform one or more types of single qubit operations on one or more qubits. Examples of single qubit operations include the sigma-X or bit flip operation, comparable to a classical NOT gate. A sigma-X operation effects a rotation of a quantum state modelled as a Bloch sphere around the X-axis. When the rotation is $\pi$ radians, state $|0\rangle$ is mapped to $|1\rangle$ and vice versa, i.e., a full bit flip. Some examples of information processor 154 perform one or more qubits a sigma-Y operation, having no classical binary counterpart. A sigma-Y operation effects a rotation around the Y-axis. If the rotation is $\pi$ radians the operation maps state $|0\rangle$ to $i|1\rangle$ and state $|1\rangle$ to $-i|0\rangle$. The sigma-Y operation is sometimes called Pauli-Y operation or gate. Information processor 154 may perform on one or more qubits a sigma-Z, or phase operation, having no classical counterpart. A sigma-Z operation effects a rotation around the Z-axis. If the rotation is $\pi$ radians the operation maps $|0\rangle$ to $|0\rangle$ and $|1\rangle$ to $-1\rangle$. The sigma-Z operation is sometimes called a phase-flip operation or gate. Examples of implementations of sigma-X, sigma-Y, and sigma-Z operations are described herein at least with reference to FIGS. 11 and 13.

In some implementations, information processor 154 includes one or more couplers that can couple qubits. This is a two-qubit operation that may be a selective operation. A two-qubit operation may be performed on a first and a second qubit. An example two-qubit operation is a CNOT gate where two qubits are taken as input and the output state of a first qubit is the NOT of the first qubit's input state conditional on the state of the second qubit's input state. A second example two-qubit operation is a CPHASE gate where two qubits are taken as input and the output state is altered by a phase factor $e^{i\varphi}$ if the two input qubits are in state $|11\rangle$. The three other inputs ($|00\rangle$, $|01\rangle$, and $|10\rangle$) remain unaffected. A third example of a two-qubit operation is an Ising operation, or sigma-Z sigma-Z operation.

In information processor 154, qubits can be communicatively coupled to one another through a number of structures and devices. In some implementations, multi-qubit interactions are mediated, for example, via a single coupler included in information processor 154. In some implementations, the multi-qubit interactions can be obtained by direct resonance coupling of the structures and devices involved without a need for couplers. For example, driving two qubits at or near resonance to effect direct resonance interaction. The information processor 154 may effect multi-qubit interactions by executing processor-executable instructions and in response to the execution bring two or more qubits on, or nearly, on resonance with each other, e.g., the two or more qubits are neighbours and interact at the same frequency. In some implementations, multi-qubit interactions are mediated via multiple couplers. The information processor 154 includes as couplers one or more optical structures. The information processor 154 may include as couplers one or more optical resonators, and/or one or more waveguides. Examples of implementations of multi-qubit operations are described herein at least with reference to FIGS. 11 and 14.

In some implementations, information processor 154 includes one or more qubits absent of associate couplers. The information processor 154 includes a quantum input system creates (e.g., establishes or varies) a linear combination of computational states for a qubit in the one or more qubits absent of associate couplers.

Analog computer 150 includes a special information processor input subsystem 156 to write to, and manipulate, information processor 154. The processor input subsystem 156 may be formed on the same substrate as information processor 154, physically coupled to information processor 154, communicatively coupled to information processor 154, or a mix of the preceding. In some implementations, processor input subsystem 156 includes a digital to analog converter. The processor input subsystem 156 may include one or more of an optical input subsystem, electric field subsystem, magnetic manipulation subsystem, mechanical subsystem, cryogenic subsystem, associated or included devices, and the like. Examples of subsystems are described herein with reference to, at least, FIG. 2. The processor input subsystem 156 may be used to encode information that is processor-readable information, including classical and quantum information, and transfer that information to information processor 154. The processor input subsystem 156 includes a light source to apply narrow or broad spectrum light (e.g., pulsed light) to parts of special information processor 154. In some implementations, processor input subsystem 156 includes an electromagnet to provide a magnetic field to parts or all of information processor 154. In some implementations, processor input subsystem 156 includes one or more emitters (e.g., wires, antennae, coils) to selectively provide control pulses for one or more times, durations, and frequencies to information processor 154. Example of a pulse generator is a PSPL10070™ generator available from Tektronix, Inc. of Beaverton, OR, US. In some implementations, the emitters are on information processor 154. In some implementations, the emitters are proximate to information processor 154 and coupled to devices on it. Microwave, radio frequency (RF), and/or electromagnetic control pulses may be used. In some implementations, processor input subsystem 156 in conjunction with control subsystem 104 is used to perform electron paramagnetic resonance (EPR) and/or nuclear magnetic resonance (NMR) on electronic and/or nuclear spins in processor input subsystem 156. In some implementations, a bulk EPR or NMR cavity surrounds the information processor 154.

In some implementations, processor input subsystem 156 includes wires electrically (e.g., galvanically) coupled to one or more electrodes, or pairs of electrodes included in information processor 154. In some implementations, processor input subsystem 156 applies DC and AC currents to electrically bias and control information processor 154 from processor input subsystem 156. For example, processor input subsystem 156 may inject or remove carriers (e.g., electrons, and holes) from one or more parts of information processor 154. Or, in some examples, the processor input subsystem 156 provides static or oscillating electrical or magnetic fields. DC currents and voltages may be provided by low noise power sources such as battery-powered voltage sources. The currents and voltages may be applied through resistive voltage dividers/combiners. AC currents and voltages may be applied to parts of information processor 154 using an arbitrary waveform generator or signal generator, such as, a TELEDYNE LECROY ARBSTUDIO 1104™ waveform generator, available from Teledyne Technologies, Inc. of Thousand Oaks, CA, US. AC currents and voltages for electron spin resonance (ESR) may be applied to parts of information processor 154 using a signal generator, such as, an KEYSIGHT E8267DTM microwave vector signal generator. NMR control may be used and include creating signals by a vector signal generator, such as, the Keysight MXG N5182A RF™ vector signal generator. Both signal generators are available from Keysight Technologies of Santa Clara, CA, US. Lines leading from and/or to information processor 154, including those shown for example in FIG. 1, may include filters, e.g., low pass, band pass, and high pass filters.

With renewed reference to analog computer 150 shown in FIG. 1, analog computer 150 includes a special information processor output subsystem 158 to, at least, read from information processor 154. The processor output subsystem 158 may be formed on the same substrate as information processor 154, physically coupled to information processor 154, communicatively coupled to information processor 154, or a mix of the proceeding. In some implementations, processor output subsystem 158 includes one or more of an analog to digital converter(s), amplifier(s), filter(s), and the like. In some implementations, processor output subsystem 158 includes an optical readout device or devices. An optical readout device (e.g., a photodetector) detects photons produced by, or in, the information processor 154 or measures the state of an optical structure included on, or in, information processor 154. An optical structure, such as a resonator, supports one or more photonic modes. Examples of optical structures are described herein. In some implementations, optical readout device(s) distinguishes between the presence, and absence, of one or more photons in the optical resonator. In some examples, optical readout device(s) detects a frequency shift for one or more photonic modes of an optical structure. One optical readout device may readout the state of one or more optical resonators. The state of an optical structure can be dependent on the state of a centre in semiconductor, such as, a G-centre, T-centre, I-centre, M-centre, or other centre described herein, coupled to the optical structure.

In some implementations, processor output subsystem 158 includes one or more photo detector(s) such as APD110C or PDA20CS2 InGaAs Avalanche photodetectors available from Thorlabs Canada ULC, Saint-Laurence, QC, CA; superconducting on chip photon detector described in Mohsen K. Akhlaghi, et al., 2015 *Nature Communications* 6: 8233; various detectors described in M. D. Eisaman, et al. 2011 *Rev. Sci. Instrum.* 82, 071101; or ADN3010-11 detector from Analog Devices, Inc. of Norwood, MA, US.

In some implementations, digital computer 102 uses processor output subsystem 158 to perform logical operations on information in information processor 154. For example, processor output subsystem 158 may be used to perform measurements on quantum states stored in or on information processor 154. In some implementations, including a strong quantum measurement device, such as, examples described herein with reference to at least FIGS. 11 and 12, measurements can replace one or more quantum operations. Universal quantum computing can be accomplished using only local gates and nonlocal (e.g., parity or multi-qubit) measurements.

A multi-qubit measurement relates to observation of a collective, group, or aggregate property of a plurality of qubits, e.g., plurality of qubits defined in information processor 154. Processor(s) 105, and/or control subsystem 104 may perform many methods in information processing that include a multi-qubit measurement readout of an aggregate property of the plurality of qubits. These methods include: quantum error correction (e.g., surface codes), quantum phase estimation, multi-qubit operations, and entanglement generation. The aggregate property of the plurality of qubits could include the parity of the qubits. Here even parity includes a balanced state, such as, an equal number of two computational states, and odd parity an unbalanced state, such as, an uneven number. Odd parity often implies an error syndrome akin to classical error detection codes based on repetition of redundant information. As an example, in the Z basis with four qubits the following states are even: $|0000\rangle$, $|0011\rangle$, $|0110\rangle$, or the like. However, in the X basis where $|+\rangle=(|0\rangle+|1\rangle)/\sqrt{2}$ and $|-\rangle=(|0\rangle-|1\rangle)/\sqrt{2}$ the even parity states include $|----\rangle$, $|++--\rangle$, $|-++-\rangle$, or the like. Other parity states can be defined for other bases and/or for other aggregate properties of the plurality of qubits.

In some implementations, processor output subsystem 158 performs single shot readout on the state of components in information processor 154. In some implementations, processor output subsystem 158 performs readout on the state of components in information processor 154 at gigahertz speed.

In some implementations, analog computer 150 is communicatively coupled to a quantum information channel 170, a communication channel. The quantum information channel 170 can be used to send information (e.g., quantum information, classical information) to and from information processor 154. The quantum information channel 170 may communicatively couple information processor 154 and one or more information processors, such as, a second instance of information processor 154. The quantum information channel 170 may communicatively couple information processor 154 to another device, such as, photon generator.

In some implementations, portions of digital computer 102 and analog computer 150 are omitted to create a smaller information processing device including information processor 154, and quantum information channel 170. In some implementations, portions of digital computer 102 or analog computer 150 are a communication device.

Figure 2:
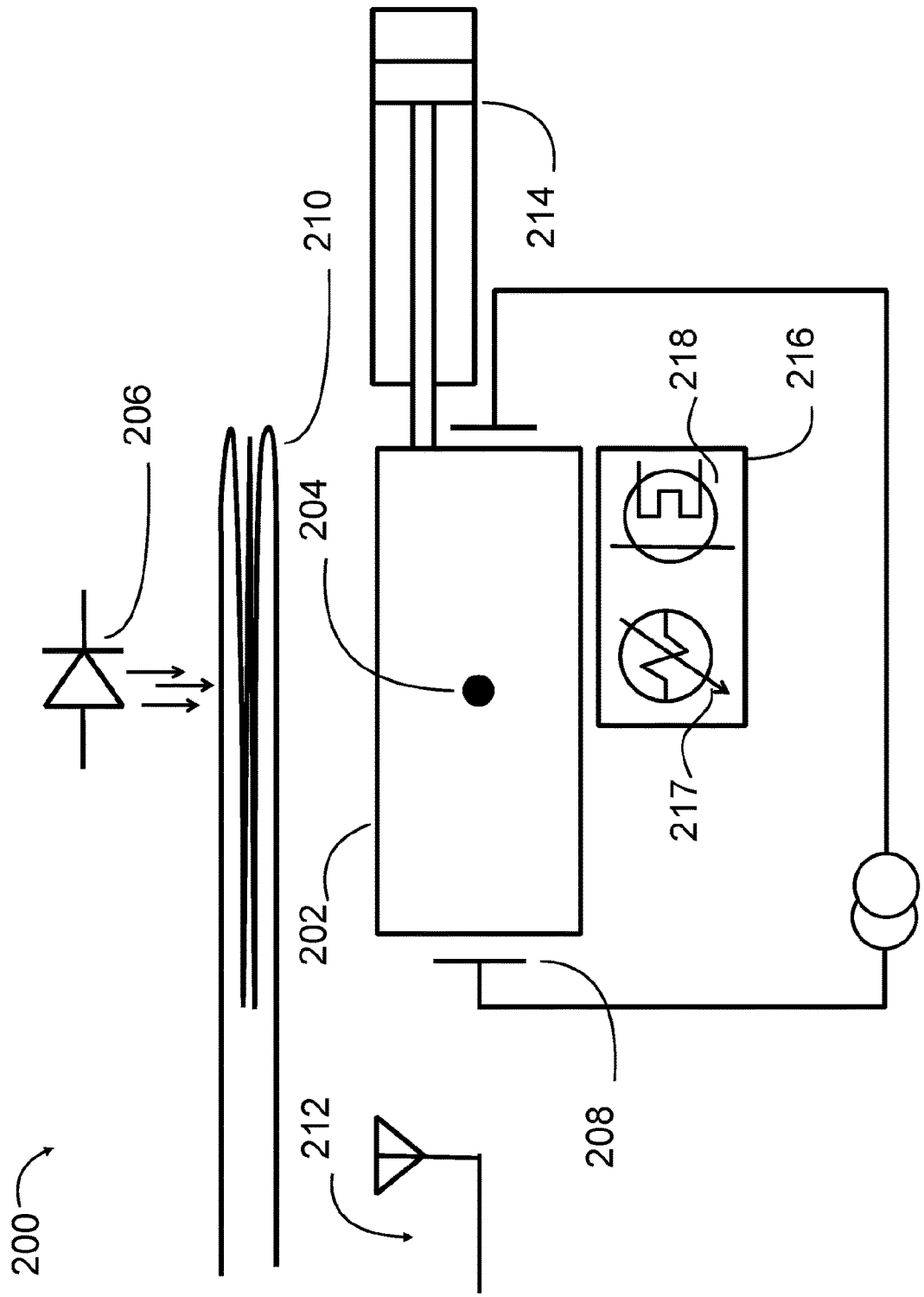
FIG. 2 is a schematic diagram illustrating an example local defect and a semiconductor material.

FIG. 2 is a schematic diagram illustrating a part of a semiconductor device 200. The illustrated part of semiconductor device 200 includes a substrate of semiconductor material, body of semiconductor material, or semiconductor material 202, and an exemplary local defect 204 disposed (e.g., created, formed, placed) within the semiconductor material 202. Device 200 may be operated as an information processor, e.g., quantum information processor, optical processor, optical device.

In some implementations, semiconductor material 202 consisting principally of silicon. In some implementations, semiconductor material 202 includes equal to or greater than fifty percent silicon by mass. The semiconductor material 202 may include equal to or greater than eighty percent silicon. In some implementations, semiconductor material 202 is silicon. In some implementations, semiconductor material 202 is natural silicon. In some implementations, semiconductor material 202 is purified non-paramagnetic silicon, e.g., silicon-28. Semiconductor material 202 can include some silicon carbide or silicon germanium. One way to increase performance metrics for a physical system (e.g., longer coherence time for a system such as quantum information processor) is to use a semiconductor material with a large fraction of non-paramagnetic nuclei. Natural silicon consists of about 95% non-paramagnetic nuclei (92.2% silicon-28 and 3.1% silicon-30) and can be purified to remove some to nearly all non-zero-nuclear spin isotopes, such as, silicon-29.

These stable isotopes can be separated by creating silicon tetrafluoride ($SiF_4$) gas and then applying centrifuge or effusion based techniques to separate the isotopes. Using isotopically purified silicon tetrafluoride, and/or isotopically purified silane ($SiH_4$) produced from the silicon tetrafluoride, wafers and crystals of isotopically purified silicon may be created using, amongst other methods, molecular beam epitaxy (MBE), chemical vapor deposition (CVD), and the like. Available isotopically purified silicon includes removing silicon-29 to levels of tens, hundreds, or thousands of parts per million. Suitable semiconductor material 202 may be purchased from an isotope supply company like Isoflex USA, San Francisco, CA, US.

In some implementations, semiconductor material 202 is an epilayer of isotopically purified silicon, grown on top of a natural silicon included in or overlying a silicon wafer. The semiconductor material 202 may be on the order of a micrometer thick while the natural silicon wafer may be up to on the order of a millimeter thick. In some implementations, the semiconductor material 202 is a thin layer of silicon, grown or deposited on top of insulating material such as silicon oxide, sapphire, silicon nitride, air, vacuum, and the like. Here silicon can refer to isotopically engineered silicon, natural silicon, or a silicon alloy such as a silicon-germanium blend, whose constituent components may be isotopically engineered.

In some implementations, semiconductor device 200 includes a local defect 204 disposed within the semiconductor material 202. Local defect 204 may be a point, localized, or local defect of the semiconductor lattice, e.g., array of Si atoms. Local may refer to defect of size of less than 5, 3, or 2 unit cell lengths, where the lattice constants of an undamaged lattice defines a cell length. A local defect may cause distortions (e.g. strain) in neighbouring cells beyond the size of the local defect.

Defect 204 may be G-centre, a local defect comprising a plurality of carbon atoms and silicon atom(s). A G-centre includes a carrier associated with a local defect where the carrier has a transition between two physical states that is optical and modified by a local degree of freedom (e.g., orbital, the spin of a carrier, a nucleus). A G-centre may comprise a pair of carbon atoms in one of two or more configurations. For example, the carbon atoms may be substitutional-interstitial atoms. The defect 204 may exist in two or more configurations, e.g., atomic configurations. In a first exemplary configuration (type-A), a first carbon atom substitutes a silicon atom at one lattice site and an adjacent lattice site is shared by a second (interstitial) carbon atom and a silicon atom. In a second configuration (type-B), an interstitial silicon atom is positioned between the first substitutional carbon atom and the second substitutional carbon atom. It is believed G-centres are charge-neutral but possess donor-like or acceptor-like levels. Defect 204 as donor-like is able to trap an electron from the conduction band in a donor state. Defect 204 may trap a hole from the valence band in an acceptor state. G-centres have been observed to be optically active with zero-phonon luminescence near 1280 nm (0.969 eV) in the so-called O-band (1260-1360 nm). Illustrations configurations of G-centres are shown in J. Wang, et al., 2014 *Journal of Applied Physics* 115, 183509.

Semiconductor device 200 with defect 204 may constructed by a plurality of techniques. Defect 204 may be created by application of an electron beam to semiconductor material 202. Application of an electron beam to semiconductor material 202 followed by annealing at low temperatures (e.g., near 100° C. for G-centres) may create a suitable defect 204. Temperatures for other defects include 450° C. for T-centres. Semiconductor device 200 with defect 204 may constructed by implantation of carbon into semiconductor material 202. Semiconductor device 200 with defect 204 may constructed by implantation of electrons, neutrons, protons, or silicon or other atoms into semiconductor material 202 pre-contaminated with carbon. The semiconductor material 202 may be a wafer including silicon. The wafer may be silicon-on-insulator wafer such as a 220 nm thick wafer overlying silicon dioxide insulator. The silicon may be extrinsic silicon doped with substitutional donor or acceptors. The wafer is subjected to beam of carbon ions with beam energy between 5 and 100 keV (e.g., 20 keV, 30 keV, 40 keV). The wafer can be treated with further carbon ions at same or different (e.g., lower energy). Optionally the semiconductor material 202 may be annealed to repair damage during ion implantation. For example, semiconductor material 202 may be heated by furnace, heater, lamp, or laser to a high-temperatures (e.g., near or over 1,000° C.) on a timescale of several seconds to a few minutes. The semiconductor material 202 is cooled at a slow rate to prevent effects of thermal shock (e.g., breakage). The Rapid Thermal Anneal (RTA) and Rapid Thermal Processing (RTP) in semiconductor manufacturing are applicable. The semiconductor material 202 can be implanted with protons with a beam at two orders of magnitude higher than carbon ions, e.g., at 2 MeV.

Local defect 204 is disposed within the body of semiconductor material 202. Defect 204 is, in some implementations, implanted, deposited, or placed far within the bulk or mass of semiconductor material 202. In at least one implementation, the placement is relatively shallower. For example, a plurality of interfaces (e.g., faces, side, or edges) define extents for semiconductor material 202. In some implementations, defect 204 is disposed at a shallow location, e.g., distance equal to or less than 10 nanometers an interface of the plurality of interfaces. In some implementations, defect 204 is disposed at a distance greater than 10 nanometers from each interface of the plurality of interfaces. In some implementations, defect 204 is disposed at a distance greater than 20 nanometers from each interface of the plurality of interfaces. In some implementations, defect 204 is disposed at a distance greater than 30 nanometers from each interface of the plurality of interfaces. In some implementations, defect 204 is disposed at a distance between 30 nanometers and 500 nanometers from each interface of the plurality of interfaces. In some implementations, defect 204 is disposed at a distance between 10 nanometers and 2 microns from each interface of the plurality of interfaces. In some implementations, defect 204 is disposed at a distance between 30 nanometers and 1 micron from each interface of the plurality of interfaces. The deeper or further the position, the further the defect 204 is away from charges that may reside on the interfaces.

These defects, e.g., defect 204, may be substitutional or interstitial defects in the lattice of semiconductor material 202. In some implementations, the semiconductor material 202 is silicon or, by mass, fifty percent or greater silicon content. In some implementations, the defect 204 is in a first part of semiconductor material 202 consisting principally of silicon while a second part of semiconductor material 202 includes other material. The type of defect and implantation method vary with implementation. Semiconductor industry standard techniques of ion implantation may be used to controllably implant defect 204 into semiconductor material 202. One fabrication process is described in U.S. Pat. No. 5,077,143A. In some implementations, defect 204 is a G-centre. That is, $C_S$–$Si_I$– $C_S$ complexes (where $C_S$ are substitutional carbon, and $Si_I$ are silicon interstitial per Kröger-Vink notation). In some implementations, defect 204 is a T-centre, I-centre, or M-centre. Defect 204 may be a luminescence centre.

In some implementations, device 200 includes one or more defects with an optical transition. In some implementations, defect 204 is a luminescence centre. Examples of luminescence centres include so called C-centre, W-centre, T-centre, I-centre, M-centre, Q-centre, carbon and nitrogen centre, carbon and gallium centre, 805 meV centre, 811 meV centre and 488 meV centre. An C-centre comprises carbon and oxygen and is known to emit light a 1570 nm (0.789 eV, 6364 $cm^{-1}$, L-band: 1565-1625 nm). A W-centre comprises a local defect in the semiconductor lattice (1.018 eV, 8210 $cm^{-1}$, 1218 nm, near IR). A T-centre comprises a local defect in the semiconductor lattice. T-centres include defects which have been shown to include one carbon atom and one hydrogen atom (935.1 meV, 7542.0 $cm^{-1}$, near IR). T-centres include defects comprising acceptors (e.g., gallium atom) in the defect, such as, the Ga1 photoluminescence defect (875 meV, 7057.4 $cm^{-1}$, near IR) and Al1 (aluminum one) defect (836 meV, 6742.8 $cm^{-1}$, near IR). A so called I-centre comprises a local defect in the semiconductor lattice (965 meV, near IR). An M-centre comprises a local defect in the semiconductor lattice (761 meV, near IR). The T-centres, I-centres, and M-centres are luminescence centres, and could be described as deep acceptors in their neutral state with mid-gap ground state levels. That is, these centres include an ionization energy around 150 meV to 400 meV. However, the luminescent excited states are excitonic, e.g. they are formed out of an additional electron-hole pair, and are shallow, even if the ground state is deep. A Q-centre comprises a local defect in the semiconductor lattice (1044 meV, 8420 $cm^{-1}$, 1188 nm, near IR). Carbon and nitrogen centres comprise at least one atom of each type at the defect and emit light at 1663 nm (0.746 eV, 6017 $cm^{-1}$, near infrared (IR)). Carbon and gallium centre comprise at least one atom of each type at the defect and are known to emit light at 1417 nm (0.875 eV, 7057 $cm^{-1}$, E-band: 1360-1460 nm). In some implementations, device 200 includes one or more defects of unknown composition but known optical characteristics. The so called 805 meV centre and 811 meV centre are believed to include platinum and emit light at 1540 nm and 1528 nm respectively (near IR). A 488 meV centre is believed to include oxygen and carbon and emits light at 1241 nm (0.488 eV, 3936 $cm^{-1}$, near IR or IR-A). Species and genera of defects described herein have one more equivalents known to a person of skill the art. These equivalents include isovalent or isoelectronic replacements or substitutions for one or more atoms includes in the defects. Isovalent substitutions have the same number of valence electrons and include elements in the same period e.g., germanium may replace carbon in a defect, or lithium replace hydrogen. Isoelectronic substitutions include isovalent substitutions as well as charged atoms from adjacent periods. Examples of defects with isoelectronic substitutions include Ga1 and Al1 defects comprising substitutions of atoms in the T-centre. The isoelectronic substitutions affect the mechanical and electronic structure of a defect and substitutions may be used to vary the vibrational or optical interactions with the defect. Further examples of defects with optical transitions are included in Gordon Davies, 1989 *Physics Reports* 176: 83-188. The optical transition may be affected by a splitting as described herein. Data shoring optical transitions in local defects in semiconductor material is shown and described herein, at least, in relation to FIG. 8.

In some implementations, device 200 includes one or more acceptor sites within the semiconductor material to receive free electrons. One suitable material for an acceptor site is boron. An acceptor could include an acceptor from Group III (13), e.g., boron, aluminum, gallium, and indium. In some implementations, device 200 includes one or more donor sites that may include a donor from Group V (15), e.g., phosphorus, and arsenic.

Device 200 may include an optical structure (not shown). The optical structure can include a resonator, optical resonator, waveguide, optical coupler, optical cavity, cavity, other arrangement of refractive and reflecting material. In some implementations, defect 204 is evanescently coupled to one or more optical structures.

Device 200 may include an optical input subsystem comprising one or more optical devices, such as, a light source 206. The optical device(s) are operable, e.g., act in response to execution of processor-executable instructions, to selectively apply light to defect 204. Light source 206 may apply light in a pulsed way. Optical devices may apply light at, at least, a first frequency to defect 204. The first frequency corresponds (e.g., near, at) to an energy difference between the pair of acceptor or donor states of defect 204 that represents computational information. Light source 206 may be communicatively coupled to the processor(s) 105 in system 100 and operate in response to processor(s) 105 executing processor-executable instructions. The optical input devices (e.g., light source 206) may be disposed in, on, near, or distant (to) semiconductor material 202. The relative locations and orientations of the devices shown in FIG. 2 have largely been chosen for illustrative purposes, for example, light from light source 206 need not be collinear with the magnetic field and perpendicular to the electric field and the like.

Device 200 may include one or more electric field subsystems including electrical devices, such as, electrodes 208. The electric field subsystem(s) can, e.g., act in response to execution of processor-executable instructions, apply an electric field profile of, at least, a first strength to semiconductor material 202 or defect 204. The electric field subsystem(s) are operable to selectively vary an electric field incident on the semiconductor material 202. The electric field subsystem(s) effect changes in the energy eigenstates of defect 204. The electric field subsystem(s) may power devices on or near semiconductor material 202. The electric field subsystem(s) may apply pulsed electrical manipulation of defect 204.

Device 200 may include one or more magnetic manipulation subsystems comprising one or more magnetic input devices, such as, coil 210 and magnet (not shown). The magnetic manipulation subsystem(s) can effect changes in the energy eigenstates of defect 204. The magnetic input device(s) are operable to selectively apply a magnetic field to semiconductor material 202 and/or defect 204 disposed within semiconductor material 202. The magnetic field may be oriented with respect to a lattice direction per grain in semiconductor material 202 or a plurality of defects like defect 204. The magnetic field may be static or varying with respect to time or location in semiconductor material 202. In some implementations, magnetic input device(s) include a wide bore superconducting magnet. Processor(s) 105 in system 100 may, in response to executing processor-executable instructions, direct coil 210 to apply a magnetic field profile to semiconductor material 202.

A magnetic manipulation subsystem(s) included device 200 may include at least one radio frequency input device, such as antenna 212, selectively operable to apply radio frequency pulses to semiconductor material 202 and/or the defect 204. A control subsystem may direct magnetic manipulation subsystem(s) (e.g., direct coil 210 and antenna 212) to flip an electronic or a nuclear spin associated with the defect 204. Processor(s) 105 in system 100 may direct the magnetic input devices and the radio frequency input device to perform magnetic resonance control, e.g., NMR and ESR, of defect 204 or a plurality of defects. For example, coil 210 may apply a field of strength $B_0$ to defect 204 and antenna 212 a radio frequency pulse at frequency that is proportional to the product of field of strength $B_0$ and the gyromagnetic ratio $\gamma$ for the spin and adjusted for additional interaction(s) of the spin in device 200.

Device 200 may include a mechanical subsystem comprising one or more mechanical input devices. An example of a mechanical input device is an actuator 214. Actuator 214 may be paired with a rest or support (not shown) disposed on an opposing side of semiconductor material 202. The mechanical input device(s) may be operable, e.g., in response to executing processor-executable instructions, to selectively vary (e.g., apply, remove) a strain in at least one direction to semiconductor material 202. Thus, the mechanical subsystem can through the strain in semiconductor material 202 effect changes in the energy eigenstates of the defect 204. The mechanical input device(s) can impart strain locally within or across semiconductor material 202. The mechanical input device(s) may be disposed in semiconductor material 202 or be physically coupled to the exterior of semiconductor material 202. The mechanical subsystem may include one or more Micro-Electro-Mechanical Systems (MEMS) devices that in response to execution of processor-executable instructions vary the strain in semiconductor material 202. The MEMS may be powered by the electric field subsystem(s). The mechanical subsystem may include one or more piezo-electric components.

Device 200 may include one or more cryogenic subsystems, such as, cryogenic subsystem 216. Cryogenic subsystem 216 is selectively operable to vary a thermal profile (e.g., temperature, temperature gradient, temperature with spatial or temporal variation) of semiconductor material 202 and effect changes in the energy eigenstates of defect 204. Cryogenic subsystem 216 may include one or both of a heater 217 or a cooler 218 thermally coupled to device 200. Cryogenic subsystem 216 may be operable, e.g., in response to executing processor-executable instructions, to selectively warm, cool, or create a thermal gradient in semiconductor material 202.

In various implementations, examples of device 200 operate as information processor with one or more input subsystem or devices are communicatively coupled to semiconductor material 202 or defect 204. The one or more input subsystem or devices may be physically coupled to semiconductor material 202. For example, a quantum input subsystem overlies the semiconductor material 202, lies near the semiconductor material 202, or is disposed within the semiconductor material 202. The optical input device, the electrical input devices, the magnetic input devices, and the like may overlie (which includes underlies) a part of semiconductor material 202, or may be structures defined in semiconductor material 202. One or more output subsystem or readout devices are communicatively and/or physically coupled to semiconductor material 202 or defect 204. For example, a photon detector may be positioned like light source 206. Further examples of read out devices and detectors are described herein, at least, in relation to FIGS. 1 and 7.

In various implementations, device 200 includes a semiconductor material 202 having one or more local defects 204. The one or more local defects 204 may be associated with local degrees of freedom, such as, spin state of one or more particle(s) (e.g., carrier, electron, hole, nucleus, singlet/triplet spin states), orbital (e.g., orbital degeneracy, spatial anisotropy of orbital orientation), valley (e.g. spatial distribution of electron or hole wavefunction), configuration (e.g. physical location of atoms and/or vacancies in the local defect), charge (e.g. number of electrons and/or holes), or a combination (e.g., spin-orbit). A respective local degree of freedom may be associated with a respective local defect 204. The local degrees of freedom may be selectively couplable to optical degrees of freedom (see FIGS. 8 and 9). The local degrees of freedom may encode information and influence the way the optical degrees of freedom work.

The device 200 may include an input subsystem (e.g., input subsystem 156) or device(s) (e.g., light source 206, electrodes 208, coil 210, antenna 212) coupled the local degrees of freedom or the optical degrees of freedom. The device 200 may include an output subsystem (e.g., output subsystem 158) or devices (e.g., readout devices, photon detectors) coupled the local degrees of freedom or the optical degrees of freedom.

The input subsystem (e.g., input subsystem 156) may couple to the local degrees of freedom and change emission properties of the local defects 204. The change in emission properties of the local defects could be measured by the output subsystem or devices. The device 204 may include a plurality of local defects and one or more optical structures optically coupled to the one or more local defects. The one or more optical structures may include a waveguide, a coupler (e.g., an input/output coupler, such as, a grating coupler), or a resonator.

The input subsystem may couple to a first local degree of freedom of a first local defect and change properties (e.g., state) of a coupled component such as the properties of a second local defect or the properties of the one or more optical structures optically coupled to the one or more local defects. The input subsystem may couple to a second local degree of freedom of an optical structure and change properties (e.g., state) of coupled component such as a first or second local defect, or properties of the one or more optical structures optically coupled to the one or more local defects. The input subsystem via a first a first or second local degree of freedom may perform cavity quantum electrodynamics (QED) and modify the emission properties of local defects by modifying optical structures and in particular a quantum vacuum in the optical structure.

Figure 3:
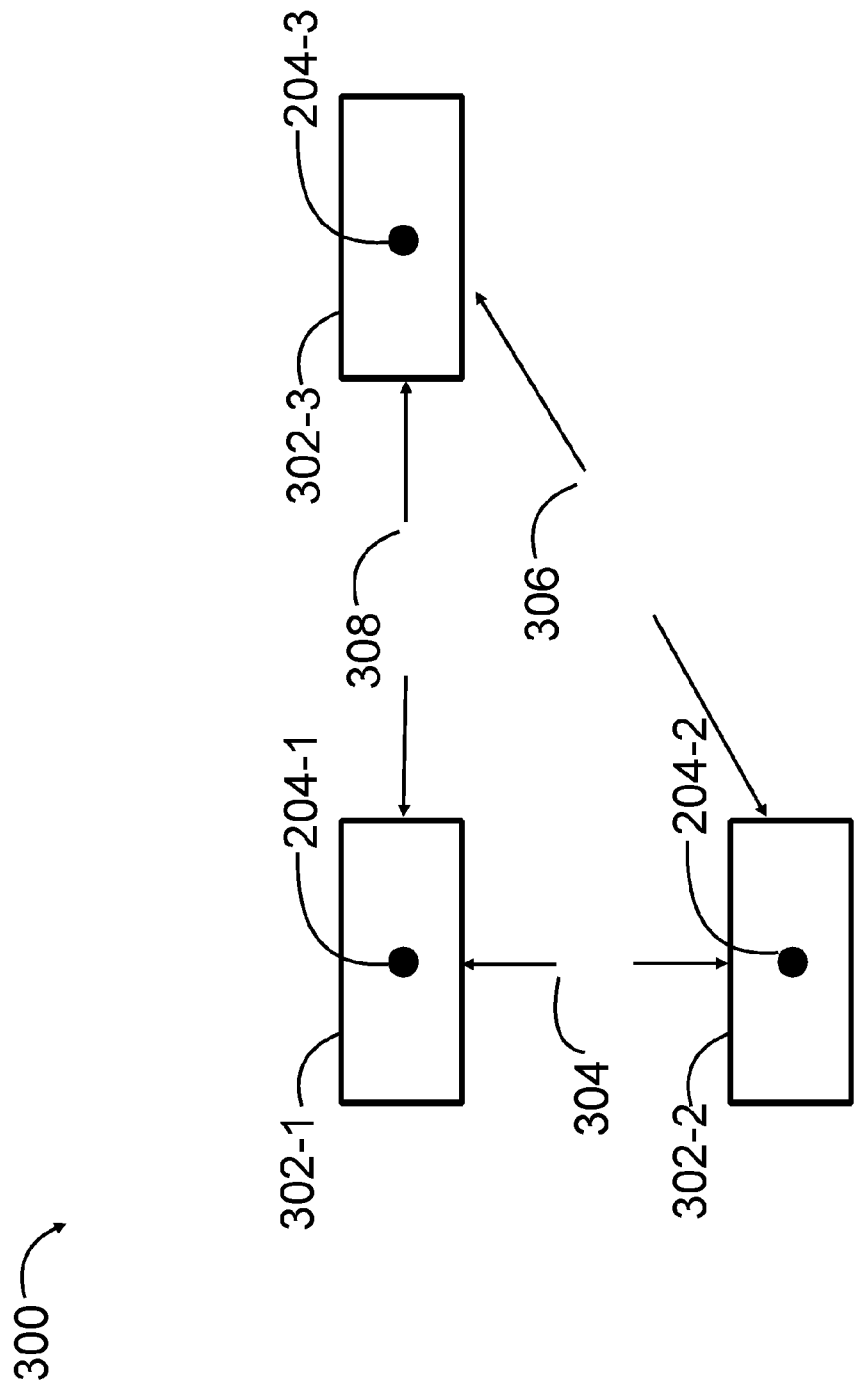
FIG. 3 is a schematic diagram illustrating an exemplary portion of an information processor.

FIG. 3 is a schematic view illustrating an exemplary part of an information processor 300. Information processor 300 includes a plurality of defects 204 and a plurality of parts 302 of semiconductor material 202 of FIG. 2. One interpretation of the schematic view in FIG. 3 is a plan view of a semiconductor chip including defects 204 and parts of semiconductor material 202.

Information processor 300 includes a plurality of defects 204-1, 204-2, and 204-3 (collectively 204) spaced apart. The plurality defects 204 are associated with a plurality of parts of semiconductor material 302-1, 302-2, and 302-3 (collectively 302) that are spaced apart. For examples parts of semiconductor material 302 are parts of body of semiconductor material 202 shown in FIG. 2.

In some implementations, parts 302 are part of a larger arrangement. For example, the larger arrangement is a two-dimensional tiling. As shown part 302-1 is spaced apart from part 302-2 by distance 304. Part 302-2 is spaced apart from part 302-3 by distance 306. Part 302-1 is spaced apart from part 302-3 by distance 308. In some implementations, the stagger of resonators is regular and two or more of distances 304, 306, and 308 are the same.

In the illustrated example, distances 304, 306, and 308 are on the order of the distance of a characteristic decay length, $\lambda/n$, where $\lambda$ is a photonic mode wavelength and n the index of refraction of the material separating the parts of semiconductor material 302-1, 302-2, and 302-3. For example, $\lambda$ may be the mean wavelength associated with dominant photonic modes in resonators included in parts 302-1, 302-2, and 302-3. In some implementations, the distance between resonators is on the order of ten times the characteristic decay length. In some implementations, the characteristic wavelength is the wavelength in the medium or media separating parts of substrate 302-1, 302-2, and 302-3. For example, in silicon the wavelength is reduced by a factor of about three, that is, $n(\lambda) \approx 3.45$ for some wavelengths $\lambda$.

The parts of semiconductor material 302 may be defined within structures sitting shy of a surface of a body comprising semiconductor material, e.g., semiconductor material 202. In some implementations, parts 302 sit proud the surface the body comprising semiconductor material and are principally separated by free space, e.g., vacuum or air. In some implementations, the parts 302 are principally separated by a cladding material such as silicon nitride. A distance such as distance 304 between parts 302-1 and 302-2 is on the order of the distance of a few hundred nanometers to a few micrometers. For examples the characteristic wavelength of an optical structure included in parts 302-1 and 302-2. In some embodiments, the characteristic wavelength is the wavelength in the medium or media separating the pair of resonators. Free space between the pair of resonators, versus intervening solid material, allows for greater distance between resonators or equal distance with larger coupling strength.

Figure 4:
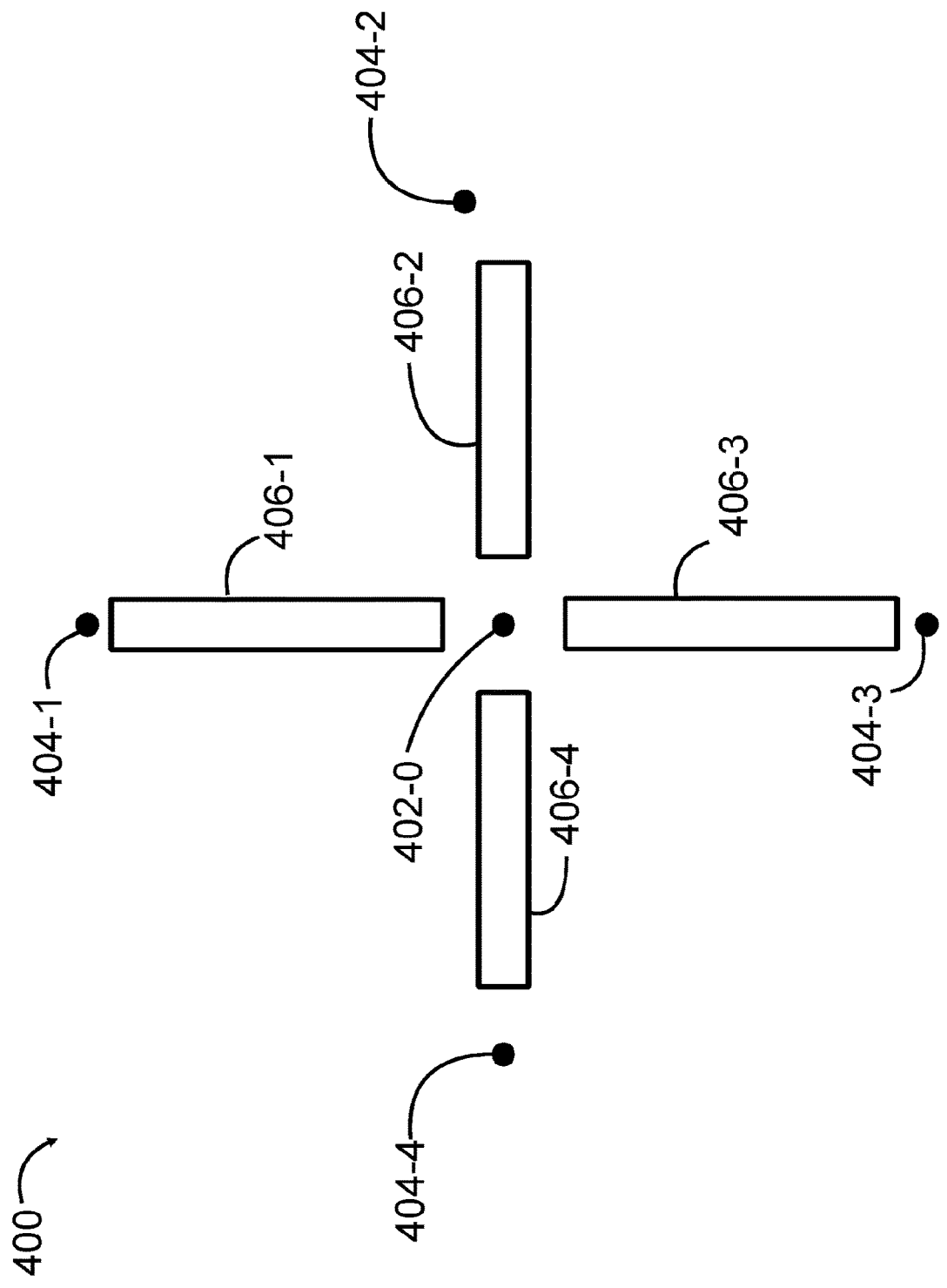
FIG. 4 is a schematic diagram illustrating an exemplary portion of an information processor including a plurality of local defects.

FIG. 4 is a schematic view illustrating an exemplary part of an information processor 400 including plurality of defects 404 (collectively) including defect 404-0, defect 404-1, defect 404-2, defect 404-3, and defect 404-4. Defects 404 may be associated with, and communicatively coupled to, a plurality of optical structures 406 (collectively). The information processor 400 includes a plurality of optical structures 406-1, 406-2, 406-3, and 406-4. An optical structure may be interposed between a first and a second defect. For example, structure 406-1 is interposed between defect 404-0 and defect 404-1. As generally illustrated in FIG. 4 both the apparent centroid and principal axis (e.g., longitudinal axis) of structure 406-1 are in line with defect 404-0 and defect 404-1. However, if a structure is coupled to a first defect and a second defect then to be "interposed between" neither the centroid and principal axis of the resonator need be in line with the first defect and the second defect. See, for example, defect 404-1 and defect 404-2 and optical structure 406-2.

In various implementations, required precision on inter-defect spacing is low. Defects 404 may have an intended stagger but also have a straggle (i.e., distance out of intended position). Local defects like G-centres are so bright that this straggle can be accommodated.

In some implementations, information processor 400 includes a plurality of couplers wherein each coupler includes a resonator. For example, optical structure 406-1 is a resonator and a coupler for defects 404-1 and 404-2. The operation of couplers is described herein at least in relation to FIG. 12.

Figure 5:
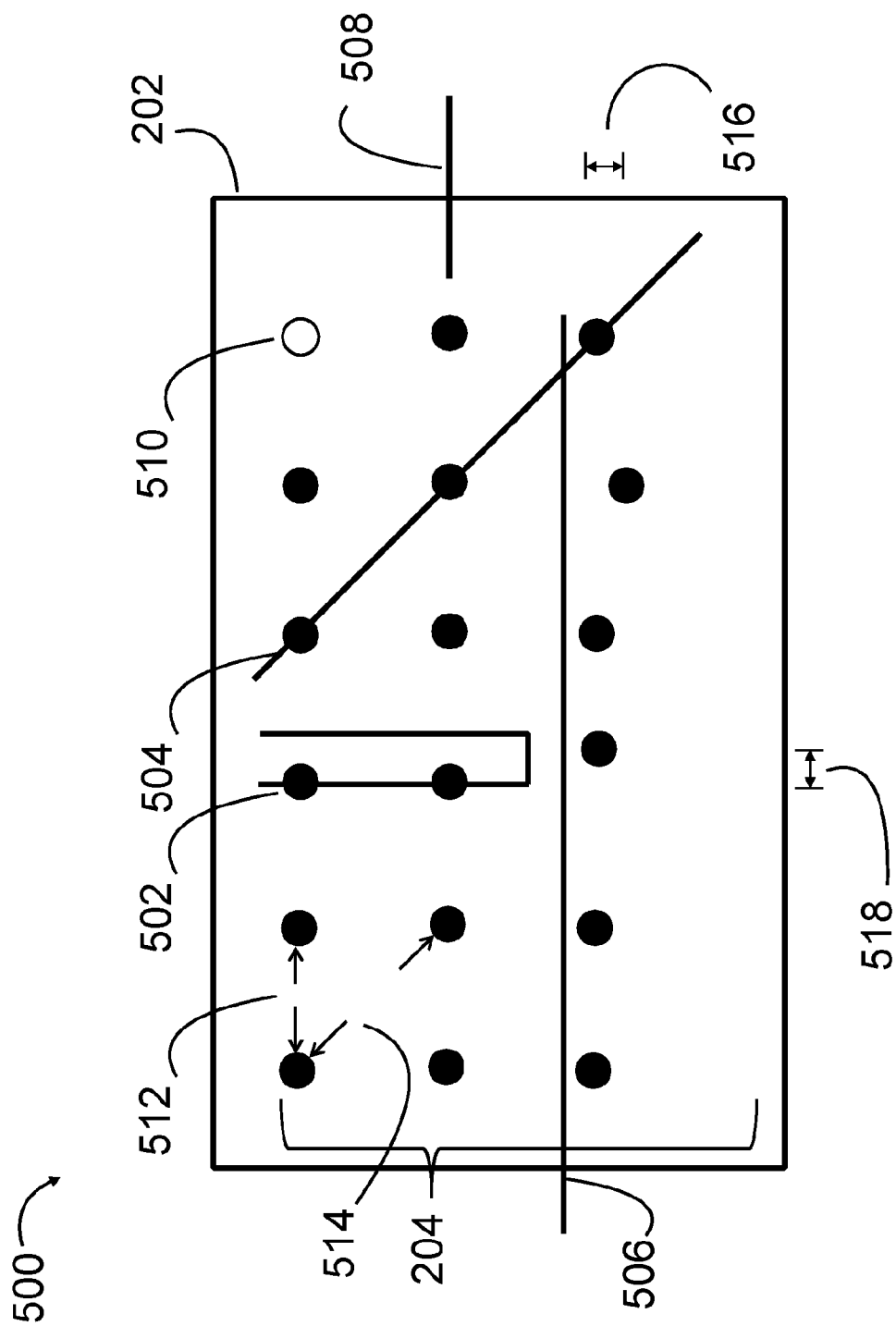
FIG. 5 is a schematic diagram illustrating an exemplary portion of an information processor including a plurality of local defects.

FIG. 5 schematically illustrates an exemplary portion of a quantum information processor 500 which includes semiconductor material 202, and a plurality of defects 204. The plurality of defects 204 are shown in a partially regular two-dimensional lattice, plurality of locations, or array but can be in an irregular lattice by design or due to imprecision in manufacturing process. The plurality of defects 204 may be in a plurality of locations characterized by a inter defect characteristic distance (c.f., material lattice with atomic characteristic distance) of one, two, or more dimensions. The plurality of defects 204 could extend in one, two, or three direction(s) in semiconductor material 202.

Quantum information processor 500 includes various optical structures 502, 504, 506, and 508. The optical structures can include waveguides, input/output optical couplers, and resonators. Waveguide 502 is proximate to (e.g., close enough for near-field or evanescent-wave interaction) at least one defect 204, as illustrated, a pair of defects 204. Waveguide 502 could be included in an on-chip coupler, for example, waveguide 506. Waveguide 502 could be included in a readout device (e.g. an input/output optical coupler) implementing the readout operations described in, FIG. 12, and the like.

Waveguide 504 (e.g., as defined in semiconductor material 202) is proximate to a plurality of defects 204. As illustrated waveguide 504 runs diagonally over some of defects 204 but need not extend in straight line or overlie the defects 204. Waveguide 506 is proximate a plurality of defects included in the plurality of defects 204. Waveguide 506 extends off semiconductor material 202 and may act as part of quantum information channel 170, quantum input system 156, and the like. Waveguide 508 may be disposed proximate to one defect included in the plurality of defects 204. Waveguide 508 may act as part of quantum information channel 170, quantum input system 156, and the like.

In quantum information processor 500, the plurality of defects 204 are arranged in a plurality of locals. However, in some implementations, there is a vacancy 510 at a defect location. In some implementations, each defect in the plurality of defects 204 is spaced away from another defect by one of a plurality of offsets or translations. For example, translation 512 and translation 514. Some defects 204 may have a straggle from an intended defect location. For example, some defects 204 are vary from intended location by displacements like displacement 516 or displacement 518.

The quantum information processor 500, a device, includes a semiconductor substrate or semiconductor material 202 including a lattice. The semiconductor material 202 includes one or more local defects 204 disposed the lattice of the semiconductor material 202. One or more carriers (e.g. electrons, holes) may be associated with one or more local defects 204 (not shown).

Figure 7:
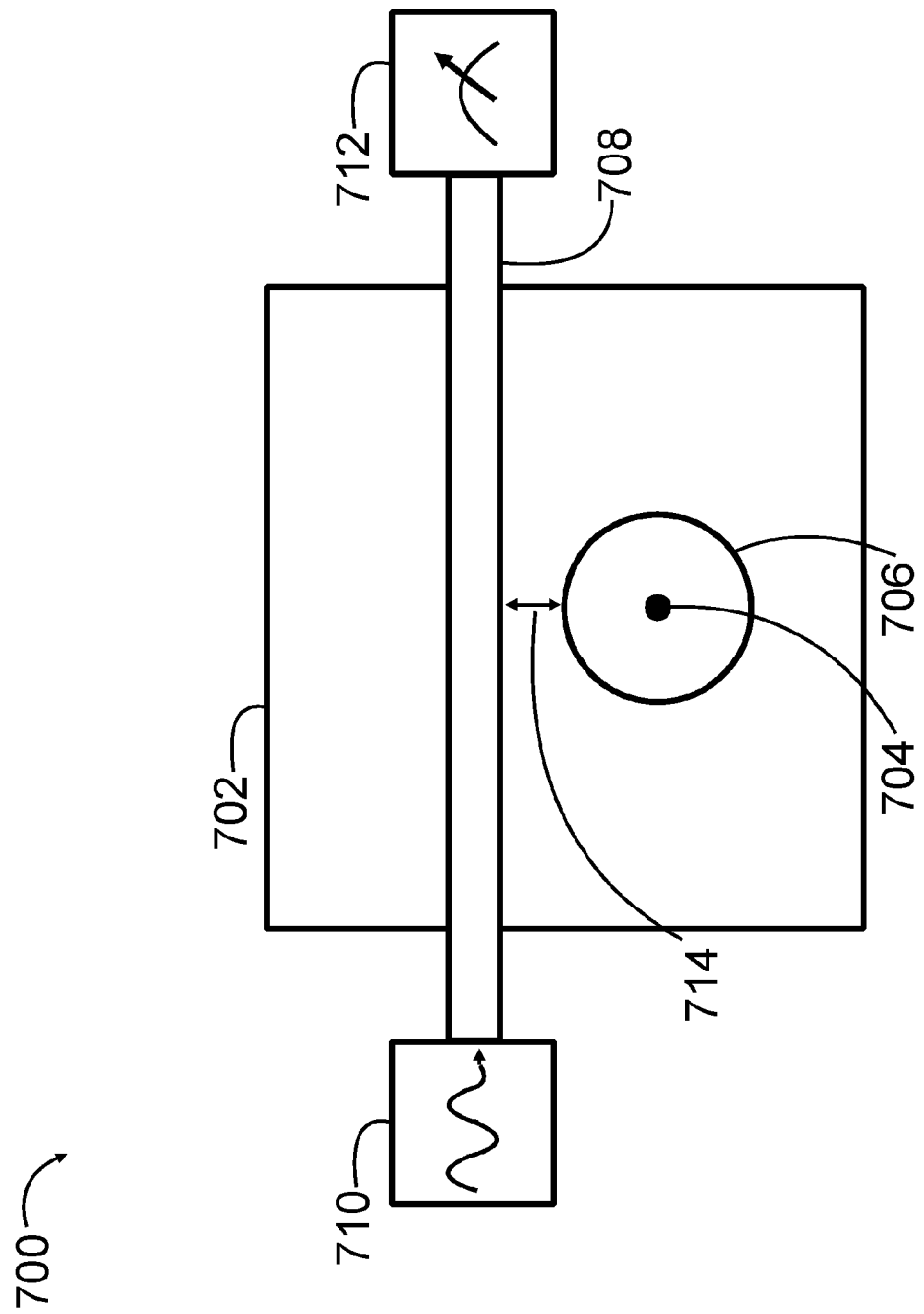
FIG. 7 is a schematic diagram illustrating an exemplary portion an information processor that includes an optical readout device.

The quantum information processor 500 may include one or more optical structures (e.g., optical structure 504, optical structure 506) coupled to the semiconductor material 202. The one or more optical structures may be communicatively coupled to the one or more local defects 204 (e.g., optical structure 508), or be physically coupled to the semiconductor material 202, or both. The one or more optical structures (e.g., optical structure 508) can hold or direct a respective photon corresponding to the respective optical transition (e.g., transition modified by a local degree of freedom). The one or more optical structures (e.g., optical structure 506, optical structure 508) may include a waveguide, input/output coupler or a resonator (not shown in FIG. 5 c.f. FIGS. 4 and 7). An optical structure may server as an on-chip coupler such as shown in FIG. 4.

In some implementations, the plurality of defects 204 all include the same computational states. The plurality of defects 204 may include a first set (e.g., one or more) of defects having a first pair of computational states, and a second set (e.g., one or more) of defects having a second pair of computational states.

Figure 6:
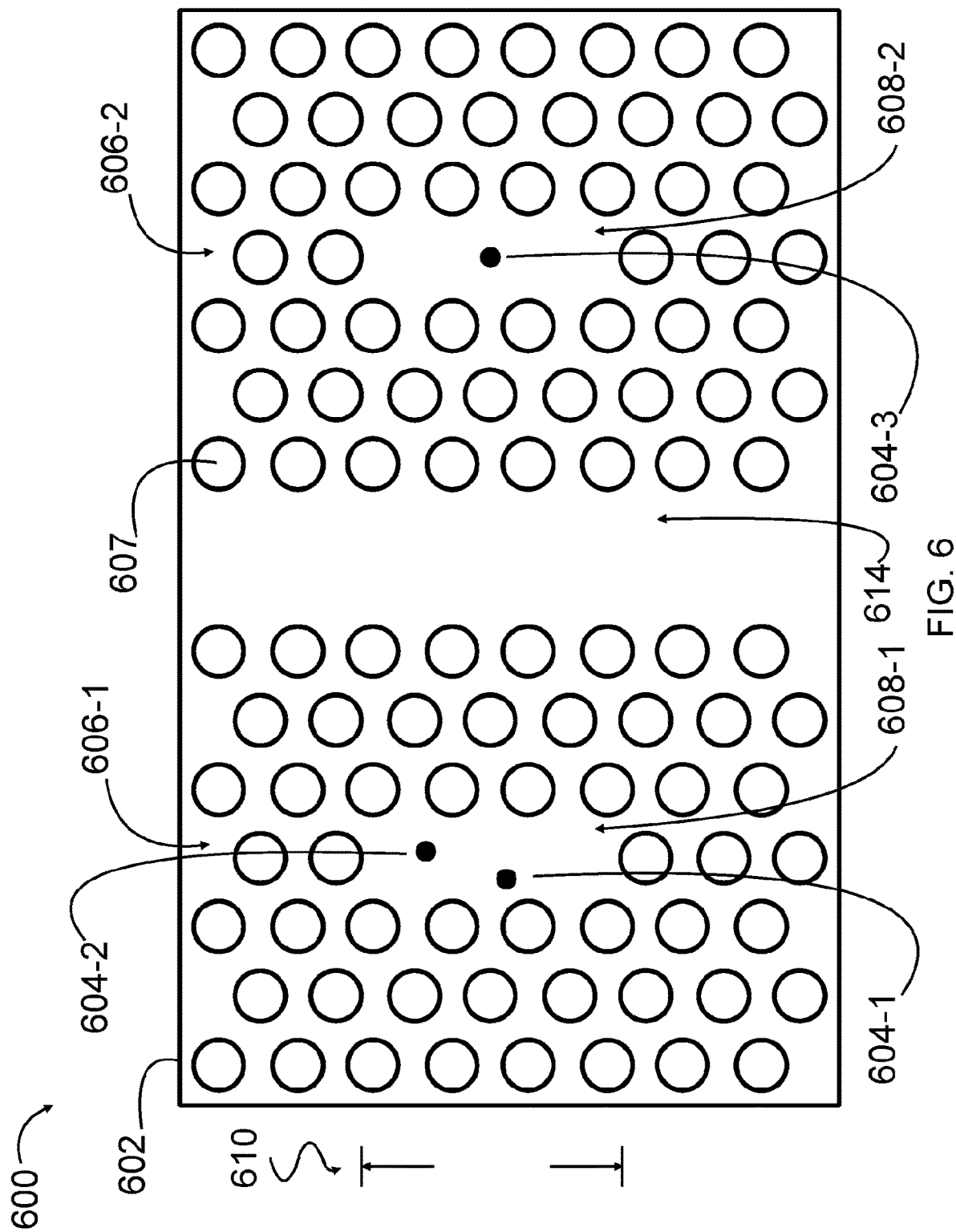
FIG. 6 is a schematic diagram illustrating an exemplary portion of an information processor that includes a pair of local defects and associated photonic crystals.

FIG. 6 is a schematic diagram illustrating an exemplary part of an information processor 600 that includes a body of semiconductor material 602, and plurality of defects 604 and associated photonic crystals 606. The pair of photonic crystals 606 (photonic crystal 606-1 and photonic crystal 606-2) are defined in a semiconductor material 602.

Photonic crystals 606-1 and 606-2 provide electromagnetic band gaps to prevent, or diminish, or change the direction of propagation of photons in semiconductor material 602. Photonic crystals 606 include one or more optical structures (e.g., structure 607) that affects the motion of photons within and through the structure. A photonic crystal is characterized by a band gap, or stop band. A band gap is a range of electromagnetic frequencies at which no photons can be transmitted through a substrate, e.g., semiconductor material 602.

In some implementations, fabrication of one or more information processors includes use of semiconductor fabrication facilities, machines, and procedures for CMOS wafers. In some implementations, fabrication of quantum information processor(s) includes thin film deposition, patterning, and etching. Unless the specific context requires otherwise, throughout this specification the terms like "deposit", and "deposition" are used to encompass any method of material deposition, including but not limited to physical vapor deposition (PVD), chemical vapor deposition (CVD), plasma-enhanced PVD, plasma-enhanced CVD, and atomic layer deposition (ALD). Unless the specific context requires otherwise, throughout this specification the terms like "pattern", and "patterned" are used to encompass any method of forming materials on, in, and overlying a substrate, or the substrate, to particular shapes or patterns by applying and treating mask material (e.g., resists), and defining in geometric shapes in the mask material via exposure to radiation, e.g., light or electrons. Etching removes layers of material, e.g., substrates, semiconductor layers, dielectric layers, oxide layers, electrically insulating layers, and/or metal layers according to desired patterns set out by photoresists or other masks. Exemplary etching techniques are wet chemical etching, dry chemical etching, plasma etching, physical etching, and reactive ion etching.

In some implementations, features like feature 607 are holes (e.g., cylinders, depressions, holes, indentations, or voids) defined the semiconductor material 602. The features in photonic crystals may be regular, e.g., an equilateral triangular array. In some implementations, features like feature 607 are protrusions (e.g., cylinders, hills, or bumps)

Photonic crystals 606 includes one or more interruptions or voids 608 (collectively)(e.g., void 608-1 and void 608-2) defined within the a generally periodic acoustical structures including two or more features, e.g., voids and protrusions. As illustrated in FIG. 6, photonic crystals 606 include an arrangement of features defined in or on semiconductor material 602. Defined in the one or more voids 608, defined in photonic crystals 606, are the defects 604. Defect 604-1 and defect 604-2 are included in void 608-1. Defect 604-3 is shown as included in void 608-2. Void 608 may be characterized or described by a principal axis, and a spatial extent or length L (line segment 610) along or parallel to the principal axis of the void 608. Voids can be back filled with material of different refractive index to the semiconductor material 602.

FIG. 7 is a schematic diagram illustrating an exemplary portion of an information processor 700 that includes first and second optical structure. Information processor 700 includes a body of semiconductor material 702, with a defect 704 implanted therein. Information processor 700 may include a first optical structure 706. Information processor 700 may include or be communicatively coupled to a second optical structure 708. As illustrated the first optical structure 706 is a resonator proximate to the defect 704 and the second optical structure 708 is a waveguide, e.g., an optical fiber. The defect 704 may be is coupled to the first optical structure 706 or second optical structure 708. The state of the defect 704 may be read out via an interaction including defect 704 and the second optical structure 708. The interaction of the defect 704 and the second optical structure 708 can optionally include the first optical structure 706 as well.

The first optical structure 706 may be defined on or in semiconductor material 702. The first optical structure 706 may be communicatively coupled to the second optical structure 708 and separated by distance 714. In some implementations, the second optical structure 708 is an on-chip photonic waveguide. In some implementations, optical fiber is used.

A light source 710 sends light through the second optical structure 708 to interact with defect 704, and be measured at detector 712. The first optical structure 706 may be coupled to defect 704, second optical structure 708, light source 710, or detector 712. The state of defect 704 affects the state (e.g., frequency, phase, presence) of one or more photons in the second optical structure 708. In some implementations, the transmission of light from light source 710, through second optical structure 708, and into detector 712, will vary depending upon the state of defect 704, e.g. depending upon the state of a local degree of freedom of defect 704. In some implementations, the probability that light emitted from light source 710 is detected at detector 712 will depend upon the state of the local degree of freedom of defect 704, e.g. by a state-dependent change in optical properties of the defect 704 or a state-dependent change in optical properties of optical structure 708. Detector 712 may be an ID230 NIR photon detector from ID Quantique SA, Carouge, GE, CH, or another detector described herein at least in relation to FIG. 2.

Figure 8:
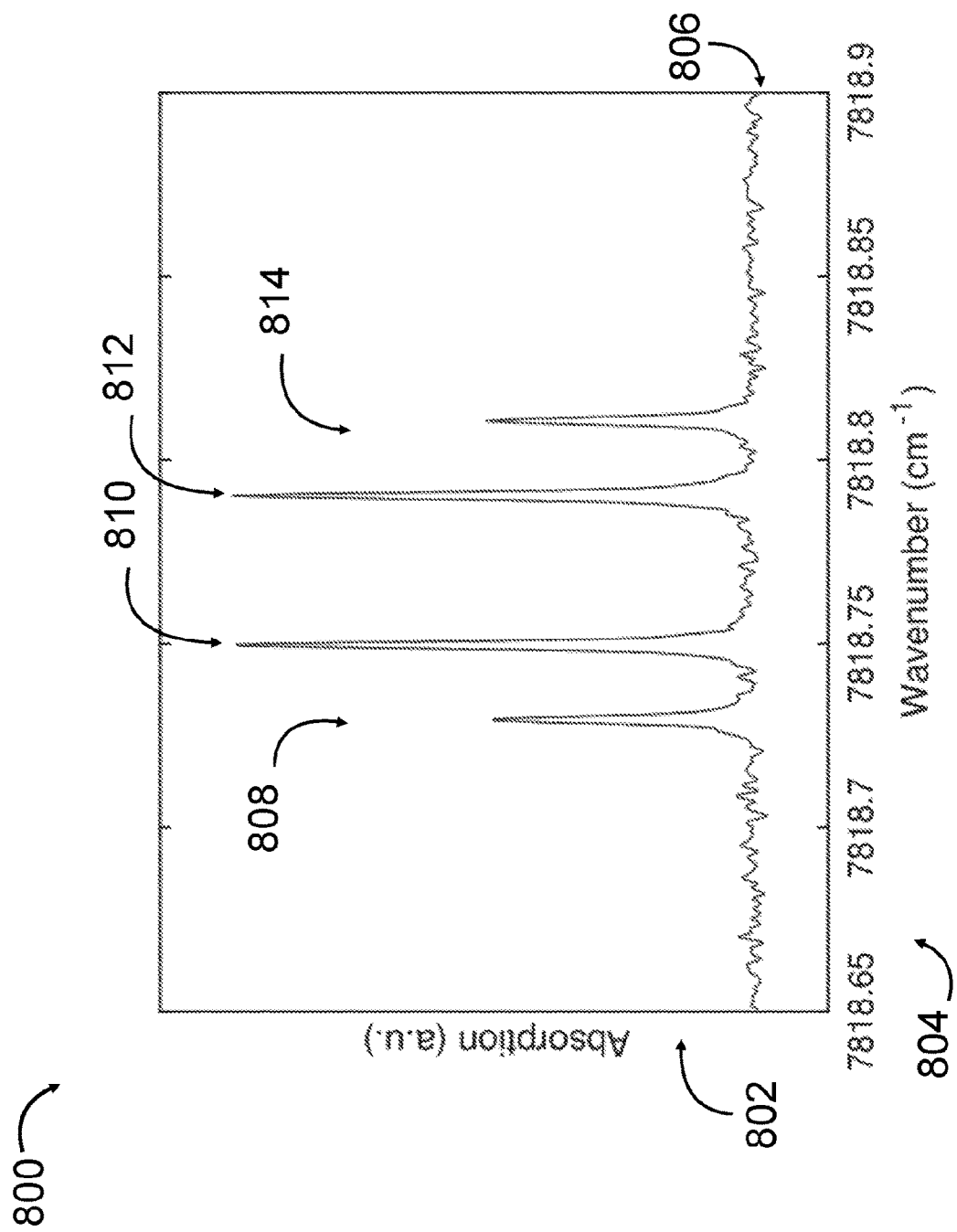
FIG. 8 is a graph illustrating absorptions by a local defect in a semiconductor material.

FIG. 8 includes graph 800 which illustrates absorption from a local defect in semiconductor material, e.g., local defect 204 in semiconductor material 202. Graph 800 includes axis 802 and axis 804. Axis 802 is proportional to a metric of signal strength, such as, absorption count, power, or the like. Axis 804 is proportional to wavenumber of the signal. Wavenumber is the frequency divided by the speed of light, or, equivalently a value proportional to the reciprocal of wavelength. Here the units are $cm^{-1}$. For example, 7818.75 $cm^{-1}$ is approximately 1279 nm or 234.4 THz, in the near infrared. Graph 800 includes curve 806 plotting absorption against wavenumber for local defects in semiconductor material. The curve 806 corresponds to data for a plurality of G-centres in a predominately silicon-28.

Curve 806 in graph 800 includes four peaks: peak 808, peak 810, peak 812, and peak 814. The relative locations and heights of peak 808, peak 810, peak 812, and peak 814 indicate transitions present at the local defects in semiconductor material are in the optical range and the transitions are modified by at least one local degree of freedom. For example, the transitions may be modified by orbital state, or spin, such as, carrier spin, e.g., electron spin or hole spin.

Figure 9:
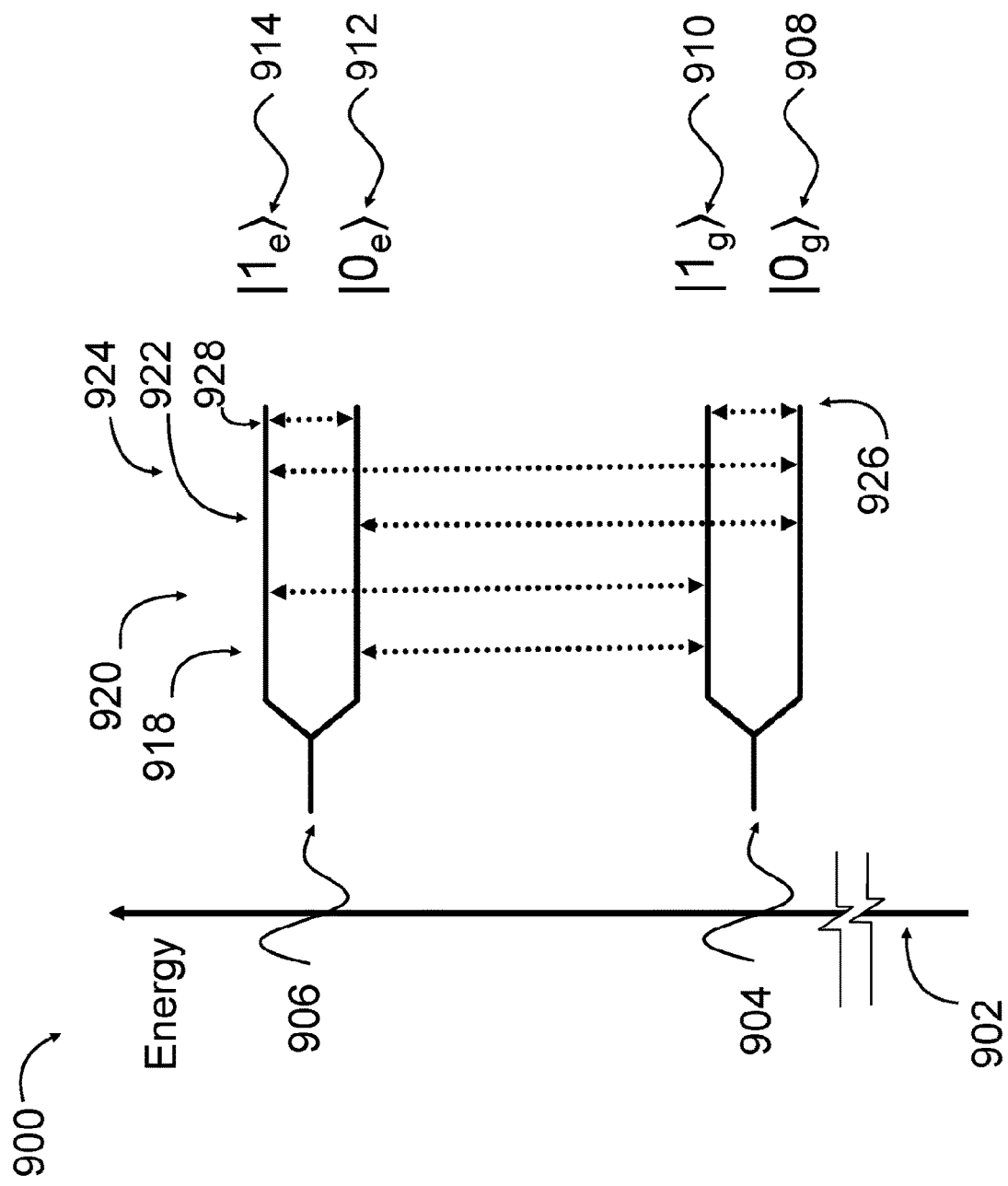
FIG. 9 is a graph illustrating energy levels a local defect in a semiconductor material.

FIG. 9 is a schematic diagram which illustrates an exemplary plurality of energy levels 900 for a local defect in a semiconductor material. The exemplary plurality of energy levels 900 are plotted against axis 902 which is proportional to an energy scale. The exemplary plurality of energy levels 900 include a plurality of states associated with local degrees of freedom of the local defect in a semiconductor material. The exemplary plurality of energy levels 900 correspond to plurality of states of the local degrees of freedom for a given charge state. There is a plurality of potential charge state cases for a defect in semiconductor material. For example, the defect is pre-loaded, or charged, with a carrier, e.g., an electron or a hole. The defect may be pre-loaded with a plurality of carriers. In other implementations, the defect is neutral. As illustrated energy levels 900 include a ground level 904 and an excited level 906.

Ground level 904 and excited level 906 may be split (e.g., split in two, three) or otherwise modified (e.g., shifted). For example, data shown in FIG. 8 suggests ground level 904 and excited level 906 are modified by an aspect of the local defect 202 in the semiconductor material 204. The ratios of the absorption peaks suggest level 904 and level 906 are split in two, e.g., by a local degree of freedom associated with the local defect in a semiconductor material, for example, modified by orbital state or carrier or nuclear spin. As illustrated level 904 is split into level 908 and level 910, and level 906 is split into level 912 and level 914. The splitting could be due to electron-electron spin effects, nuclear spin, orbital splitting, crystal field splitting spin effects, valley state, or the like.

Level 908 may be labelled $|0_g\rangle$. Level 910 may be labelled $|1_g\rangle$. Correspondingly level 912 and level 914 may be labelled $|0_e\rangle$ and $|1_e\rangle$.

Between level 910 and level 912 is transition 918 corresponding to peak 808 shown in FIG. 8. Between level 910 and level 914 is transition 920 corresponding to peak 810 shown in FIG. 8. Between level 908 and level 910 is transition 922 corresponding to peak 812 shown in FIG. 8. Between level 908 and level 914 is transition 922 corresponding to peak 814 shown in FIG. 8. The differences in energy levels means absorption and emission properties depend upon the state of the local degree of freedom. Between level 908 and level 910 is transition 926. Between level 912 and level 914 is transition 928.

The exemplary plurality of energy levels 900 show different ways of creating a qubit from a defect in semiconductor material, e.g., defect 204 in semiconductor material 202. An input subsystem, such as input subsystem 156, may, in response to execution of processor-executable instructions, may drive the state of the defect in semiconductor material between a ground state (e.g., level 908) and an excited state (e.g., level 912).

In some examples of operation of a defect in semiconductor material in a neutral ground state the input subsystem excites an electron from the multi-particle local ground state making up the lattice bonds with other semiconductor material atoms into an exciton state: a local electron-hole pair associated with the defect. The ground state could be split by multi-electron effects, e.g., singlet and triplet for pairs of electrons and generalizations thereof for multi-electron systems, or for different orbital, valley or crystal field splittings.

Energy levels 900 exist and luminescence occurs when a carrier (e.g., an electron) moves from one of the excited state levels (e.g., level 912, level 914) to one of the ground state levels (e.g., level 908, level 910). Graph 800 and curve 806 in FIG. 8 show there are at least two energy levels in the ground and excited states (two each are illustrated in FIG. 9). The ground states or the excited states can be used to encode information, e.g., quantum information, or classical information.

Figure 10:
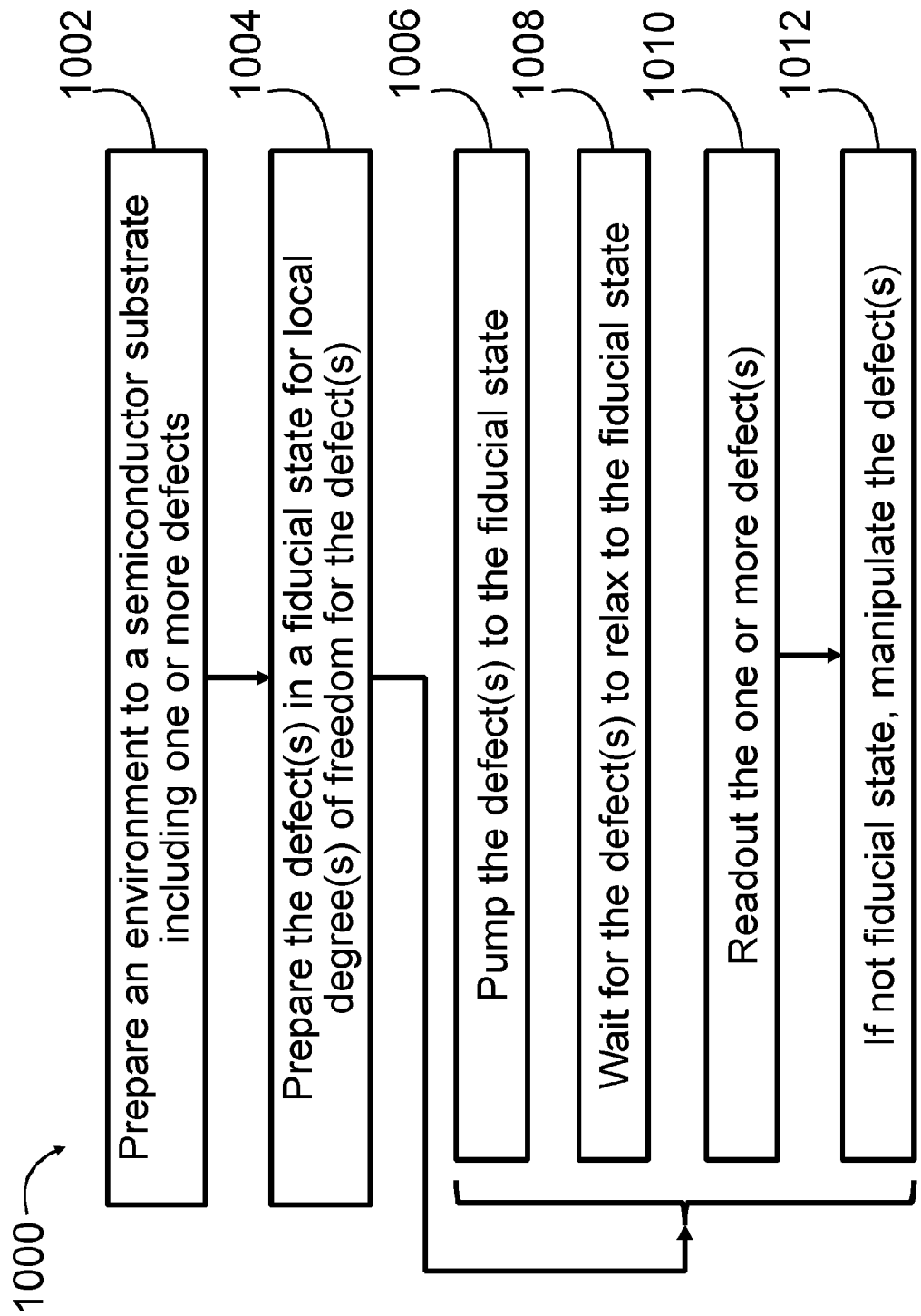
FIG. 10 is a flow-diagram illustrating an implementation of an example method of operation of an information processor including one or more initialization operations.

FIG. 10 illustrates an example method 1000 (including, for example, acts 1002, 1004) of operation for an information processor, such as, information processors or devices 154, 200, 300, 400, 500, 600, or 700. For method 1000, as with other methods taught herein, the various acts may be performed in a different order than that illustrated and described. Additionally, the methods can omit some acts, and/or employ additional acts. One or more acts of method 1000 may be performed by or caused to be performed by one or more circuits, for instance, one or more hardware processors. In some implementations, method 1000 is performed by a controller, e.g., control subsystem 104 of system 100.

Method 1000 normally begins by invocation from a controller. At 1002, the controller prepares an environment comprising semiconductor material including one or more defects. For example, the controller executes processor-executable instructions, which, when executed, causes an environment subsystem and/or input subsystem 156 to prepare special information processor 154. The controller may prepare the semiconductor material including one or more local defects according to an electric profile, magnetic profile, thermal profile, or strain profile i.e., vary profile(s) for one or more of magnetic field, electric field, strain, and heat. The controller may, at 1002, prepare one or more defects in a specific carrier charge state. For example, a defect may have an associated electron, e.g., bound electron, drawn in from the semiconductor material, or drawn in from nearby donor.

At 1004, the controller prepares the one or more defects in a fiducial state, e.g., a first computational state, that includes local degree of freedom for the one more defects. At 1004, the controller prepares the one or more defects in the fiducial state by executing processor-executable instructions, which when executed cause the input subsystem to manipulate the one or more defects to the fiducial state. The controller may prepare the one or more defects in the fiducial state in different ways including acts 1006, 1008, and 1010.

At 1006, the controller prepares the one or more defects in the fiducial state by executing processor-executable instructions, which when executed cause the input subsystem to pump the one or more defects to the fiducial state. For example, the processor(s) 105 may direct the input subsystem 156 to use an optical or electrical input device to excite or elevate a defect into a computational state shown in FIG. 9, e.g., $|1_e\rangle$.

At 1008, the controller prepares the one or more defects in the fiducial state by executing processor-executable instructions, which when executed causes an information processor to wait for the one or more defects to relax into the fiducial state.

At 1010, the controller prepares the one or more defects in the fiducial state by executing processor-executable instructions, which when executed causes an information processor to readout the one or more defects. That is, measure the state of the one or more defects, such as, measure defect 204. The controller may read out the state of the one or more defects as described herein with reference to, at least, FIGS. 1, 2, and 7.

If the state of the one or more defects is not the fiducial state then at 1012 the controller may manipulate the defect(s) into the fiducial state. For example, if a defect is measured by the controller and has state, $|1>$, then the controller may perform a bit flip operation on the defect, e.g., $\sigma^x|1>=|0>$. Examples of single qubit operations are described herein with reference to, at least, FIGS. 11 and 13. Alternatively, if the state of the one or more defects is not the fiducial state then at 1012 the controller may manipulate the defect(s) based on the defect(s) being in another state, e.g., a second computational state.

Method 1000 ends until invoked again. Method 1000 may be followed by one or more other methods such as method 1100.

Figure 11:
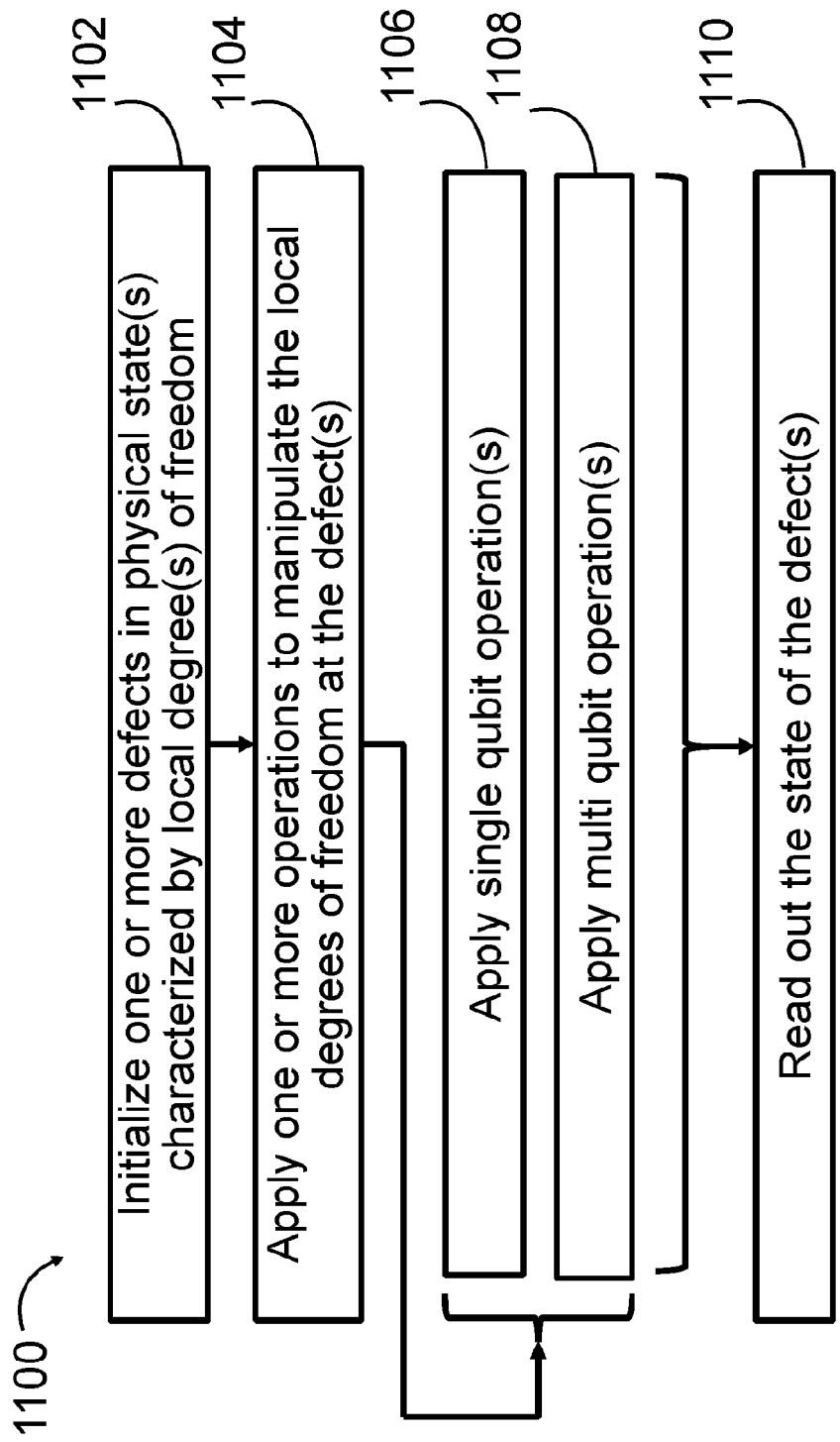
FIG. 11 is a flow-diagram illustrating an implementation of an example method of operation of an information processor including one or more qubit operations.

FIG. 11 illustrates an example method 1100 (including, for example, acts 1102, 1104) of operation of an information processor, such as, information processors or devices 154, 200, 300, 400, 500, 600, or 700. One or more acts of method 1100 may be performed by or caused to be performed by one or more circuits, for instance one or more hardware processors. In some implementations, method 1100 is performed by a controller, e.g., processor(s) 105 of system 100.

Method 1100 normally begins by invocation from a controller. At 1102, the controller initializes one or more defects in physical states characterized by one more local degrees of freedom associated with the one more defects. The local degree of freedom may be a spin (e.g., carrier spin). For example, the controller prepares the one or more defects in a fiducial state that includes carrier spin state, e.g., an electron spin. The controller may prepare the one or more defects in a fiducial state by performing method 1000.

At 1104, the controller applies one or more operations to manipulate the states of the one or more defects. For example, the controller executes processor-executable instructions, and in response to executing the processor-executable instructions, the controller directs one or more operations to manipulate the physical states (e.g., computational states) of the one or more defects. At 1106, the controller applies one or more single qubit operations to manipulate the local degrees of freedom (e.g., states) of the one or more defects. See further details in FIG. 13. At 1108, the controller applies one or more multi-qubit operations to manipulate the local states of two or more defects. For example, processor(s) 105 can execute information processor control instructions 130 to direct defect 204-1 and defect 204-2 in information processor 300 to optically couple. See further details in FIG. 14.

At 1110, the controller reads out the state of the one or more defects. Examples of how a controller reads out the state of the one or more defects is described herein.

Method 1100 ends until invoked again.

Figure 12:
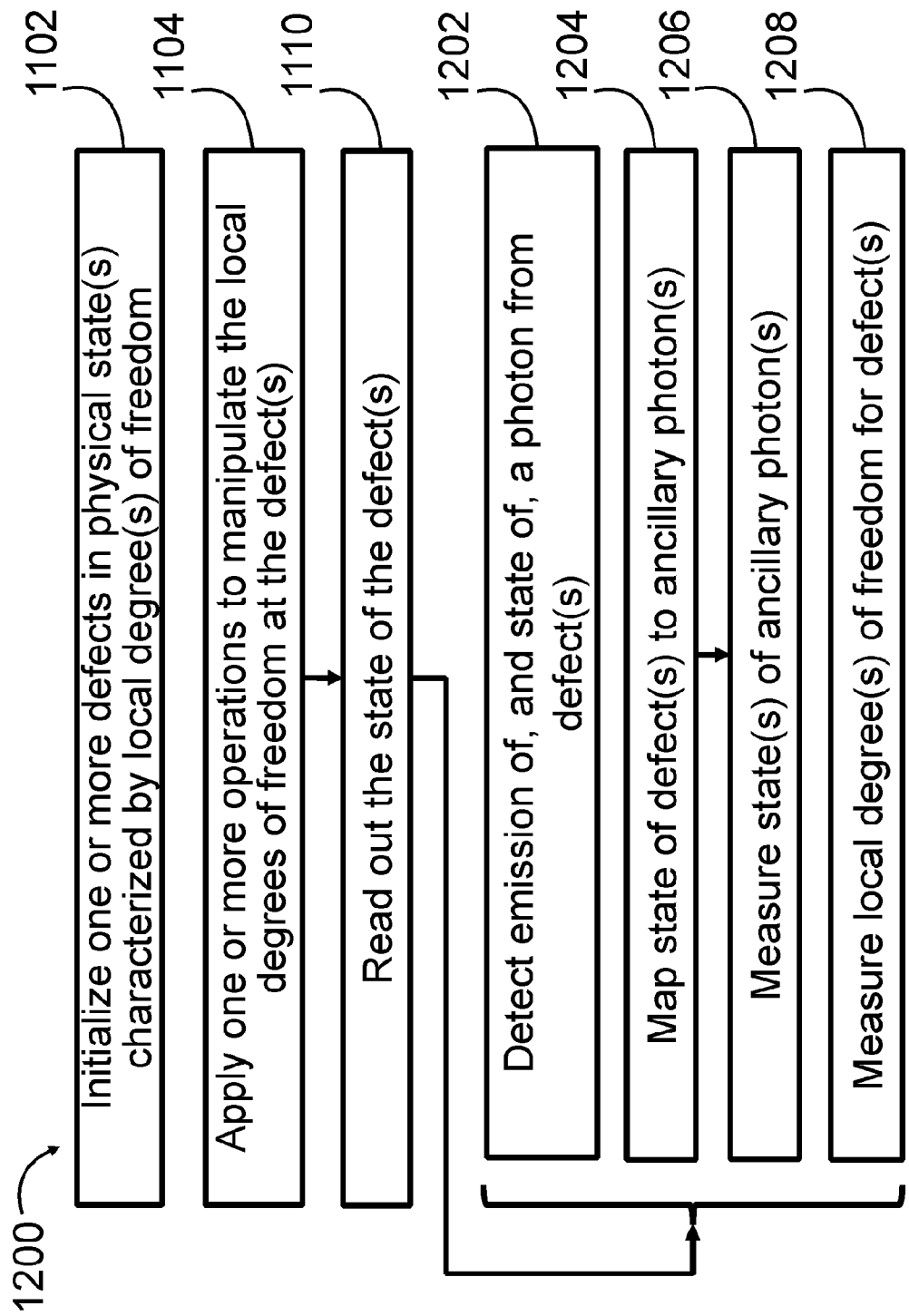
FIG. 12 is a flow-diagram illustrating an implementation of an example method of operation of an information processor including one or more readout operations.

FIG. 12 illustrates an example method 1200 of operation for an information processor, such as, information processors or devices 154, 200, 300, 400, 500, 600, or 700. One or more acts of method 1200 (e.g., acts 1102, 1104, 1110, 1202, 1204) may be performed, or caused to be performed, by one or more circuits, for instance one or more hardware processors. In some implementations, method 1200 is performed by a controller, e.g., control subsystem 104 of system 100.

Method 1200 normally begins by invocation from a controller. At 1102, the controller initializes one or more defects a fiducial state. At 1104, the controller applies one or more operations to manipulate the states of the one or more defects.

At 1110, the controller reads out the state of the one or more defects. The controller may read out the states of the one or more defects in different ways including acts 1202, 1204, 1206 and 1208. At 1202, the controller detects emission of, and state of, a photon from one defect in the one or more defects. At 1204, the controller maps a state of a defect included in the one or more defects to an ancillary photon. For example, defect 204 in semiconductor material 202 may have a first quantum state that includes a linear combination of a first and a second computational state. An ancillary photon may propagate proximate to the deep defect. The ancillary photon is in a third computational state, e.g., the third and the first computational states are the same. A controller, such as, control subsystem 104, causes a multi-qubit operation to be made on the defect and the ancillary photon, e.g., a CNOT gate with the ancillary photon as the target. Making a strong measurement on the ancillary photon fixes the state of the defect. At 1208, the controller measures one or more local degrees of freedom associated with one or more defects. For example, the defect may include two computational states which differ by a spin value.

The controller at acts 1202, 1204, or 1206 may use measurement techniques known in information processing. For example, the controller at acts 1202, 1204, or 1206 may perform a parity measurement, e.g., measure an aggregate property for a plurality of defects in the one or more defects. Examples of parity measurements are described herein at, at least, FIGS. 1 and 12. The controller at acts 1202, 1204, or 1206 may measure in a superposition basis. The controller at acts 1202, 1204, or 1206 may measure a first defect by an associated component, such as, an optical structure, or an ancillary or reporter defect. Method 1200 ends until invoked again.

Figure 13:
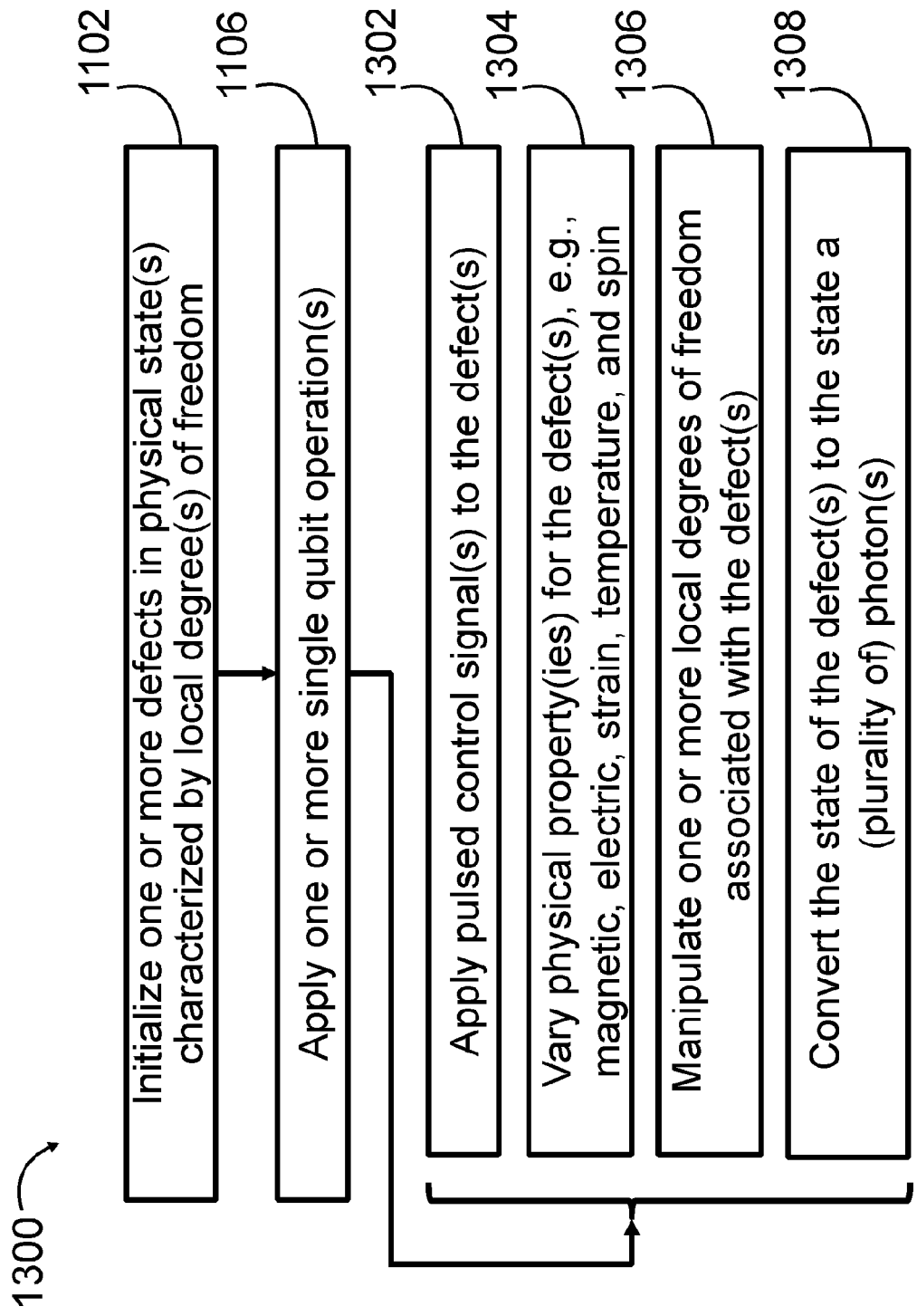
FIG. 13 is a flow-diagram illustrating an implementation of an example method of operation of an information processor including one or more single qubit operations.

FIG. 13 illustrates an example method 1300 of operation for an information processor, such as, information processors or devices 154, 200, 300, 400, 500, 600, or 700. One or more acts of method 1300 (e.g., acts 1102, 1106, 1302, 1304, etc.) may be performed, or caused to be performed, by or via one or more circuits, for instance one or more hardware processors. In some implementations, method 1300 is performed by a controller, e.g., processor(s) 105 of system 100. In some implementations, the processor(s) 105 executes the quantum information processor control instructions 130 and in response system 100 performs method 1300.

FIG. 13 illustrates, amongst other parts, examples of act 1106 of a quantum information processor, such as, information processors or devices 154, 200, 300, 400, 500, 600, or 700.

Method 1300 normally begins by invocation from a controller. At 1102, the controller initializes one or more defects in a fiducial state. At 1106, the controller applies one or more single qubit operations to manipulate the state(s) of the one or more defects. The controller may apply one or more single qubit operations to manipulate the states of the one or more defects in different ways including acts 1302, 1304, 1306, and 1308.

At 1302 the controller applies (or causes to be applied) pulsed signals to the one or more defects. Pulsed signals are time varying signals (e.g., shaped) at the appropriate frequency (e.g., near the energy difference for the computational states) with appropriate phase and duration to effect a gate operation. For example, the controller could effect a pi/2 sigma-X pulse on the one or more defects. The pulsed signals can be implemented via the light source 206.

The controller, at 1302, can cause signals to be applied at an appropriate frequency, such as, a frequency corresponding to the energy difference between the computational states of a qubit in the qubit's rotating frame. For example, the qubit may be driven by a series of pulses along a path defined on the Bloch sphere with the effect of changing the effective difference in energy between computational states. Such a driven qubit can be manipulated by near resonant signals to this changed energy difference.

The controller may, at 1302, apply signals by the sum or difference of two primary signals. For example, the controller cause and input subsystem to apply two pulses that differ in frequency by a "near-computational" frequency difference.

At 1304 the controller varies (or causes to be varied) physical conditions for the one or more defects. For example, the controller can direct the quantum input subsystem 156 to vary the profile for magnetic field, electric field, strain, and heat. For example, the controller could cause electrodes 208 to vary the electric field for defect 204. The controller could operate light source 206 to vary the electric field for defect 204. In some implementations, the controller could vary the magnetic field profile through one or more magnetic input devices such as coil 210. The controller could vary the strain profile (e.g., strength, location, gradient, anisotropy) via one more mechanical input devices. In some implementations, the controller could vary the thermal profile for one or more quantum information processors. For example, the controller could cause heater 217 and cooler 218 to vary the temperature of the defect.

At 1306, the controller manipulates (or causes to be manipulated) local degrees of freedom (e.g., spins) associated with the one or more defects. The controller could apply (or cause to be applied) pulsed signals to the one or more defects. The pulsed signals can be implemented by the magnetic manipulation subsystem, coil 210, and antenna 212. The pulse signals could be directed at the quantum information processor, such as, information processors or devices 154, 200, 300, 400, 500, 600, or 700. The controller may map information from a first set of states associated with the one or more defects to a second set of states, manipulate the information within this second set of states, and map the information back to the first set of the one or more defects. In other words, at 1306, the controller manipulates a defect by temporarily manipulating an associated degree of freedom such as spin. The controller can, at 1306, manipulate other local degrees of freedom.

At 1308, the controller converts (or causes to be converted) a state of a photon into a state of a local degree of freedom associated with a first defect in the one or more defects. In 1308, a photon may arrive at the first defect, or at an optical structure optically coupled to the first defect. The photon could arrive via waveguide such as quantum communication channel such as channel 170 of system 100. The photon has a first quantum state. In 1308 the controller creates (or causes to be created) a second quantum state in the first defect. In some implementations, the photon has a second quantum state dependent upon the first quantum state, e.g., same as, corresponding to, mapping between states. Further examples of creating a second computational state for the first defect (e.g., luminescence centre) dependent on the first computational state of a photon are described in commonly assigned WO patent application publication no. WO 2017089891 A1.

Method 1300 ends until invoked again.

Figure 14:
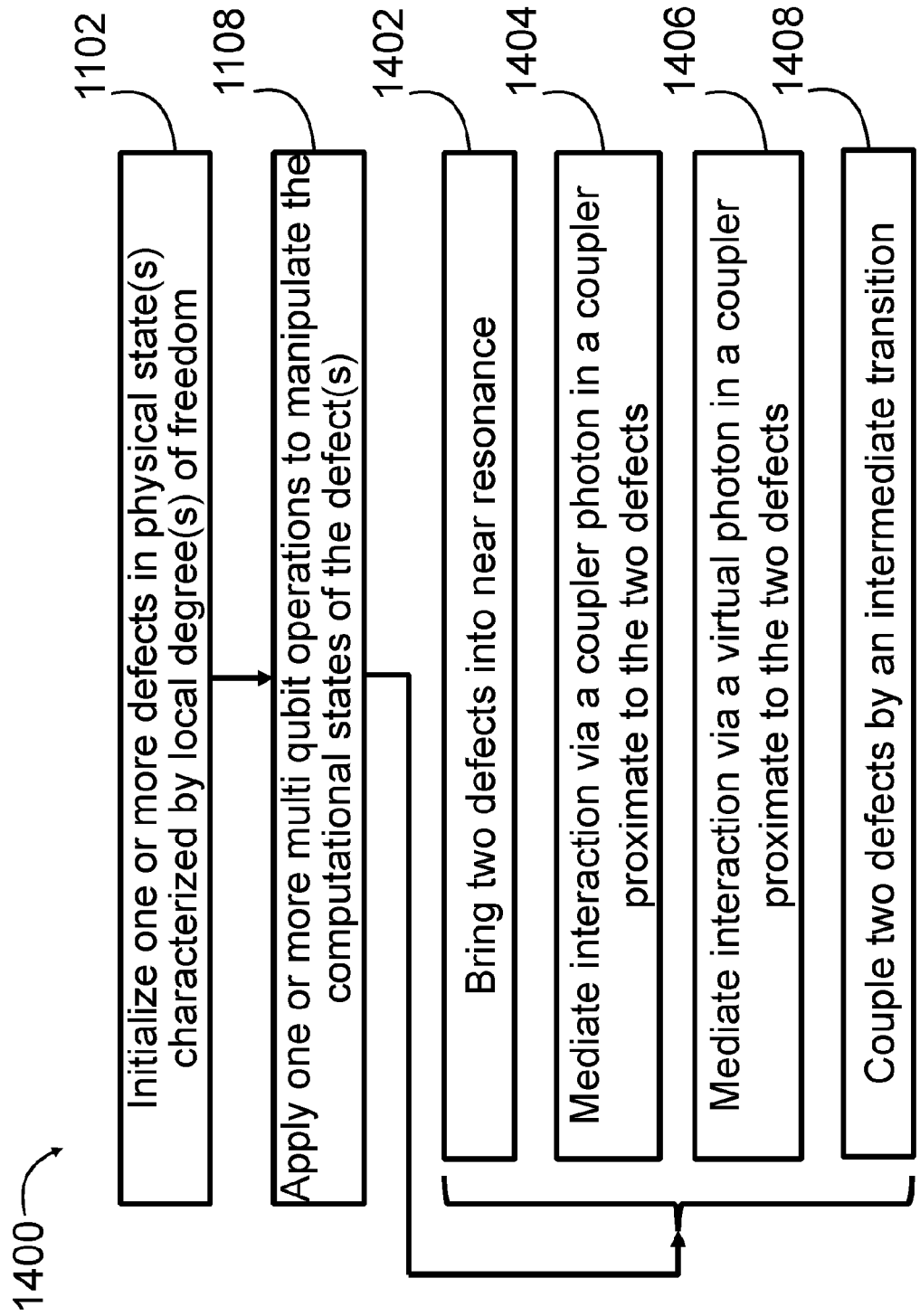
FIG. 14 is a flow-diagram illustrating an implementation of an example method of operation of an information processor including one or more multi-qubit operations.

FIG. 14 illustrates an example method 1400 of operation for a quantum information processor, such as, information processors or devices 154, 200, 300, 400, 500, 600, or 700. One or more acts of method 1400 (e.g., acts 1102, 1108, 1402, 1404) may be performed by or via one or more circuits, for instance one or more hardware processors. In some implementations, method 1400 is performed by a controller, e.g., control subsystem 104 of system 100. In some implementations, the control subsystem 104 executes the quantum information processor control instructions 130 and in response system 100 performs method 1400.

FIG. 14 illustrates, amongst other parts, examples of act 1108 for a quantum information processor, such as, information processors or devices 154, 200, 300, 400, 500, 600, or 700.

Method 1400 normally begins by invocation from a controller. At 1102, the controller initializes one or more defects in a fiducial state. At 1108, the controller applies one or more multi-qubit operations to manipulate the states of the two or more defects. The controller may apply one or more multi-qubit operations to manipulate the states of the two or more defects in different ways including acts 1402, 1404, 1406, and 1408. Herein reference to two includes two or more unless the context dictates otherwise.

At 1402, the controller brings two defects into near resonance. The controller could vary an electric field and/or magnetic field and/or strain for one or more of the two defects. The first defect can have a first transition between a pair of computational states and the second defect can have a second transition between another pair of computational states. The pairs of computational states can be logically equivalent, e.g., two pairs of |0> and |1>, that may be based on the same or different acceptor state or donor state. The controller can cause the first transition to be brought into resonance with the second transition. That is, the resonance condition can be for the energy difference between the first computational states and the second computational state of the respective defects. The controller can bring two or more defects into near resonance by driving the first transition of the first defects at or nearly at the frequency of the second transition of the second defect. The controller can bring two or more defects into near resonance by driving the two or more defects at or nearly at the same rotation frequency. The controller can bring two or more defects into near resonance for a transition in a respective defect's rotating frame. See S. R. Hartmann and E. L. Hahn, 1962 *Phys. Rev.* 128:2042-2053.

At 1404, the controller mediates interaction of two defects through a coupler photon in an on-chip coupler proximate to the two defects. For example, coupler 702, an optical structure, disposed proximate to a first defect 204-1 and a second defect 204-2, and communicatively coupled to an input subsystem, e.g., quantum input subsystem 156. The controller could, in response to executing processor-executable instructions, direct the input subsystem to couple the first defect and the second defect via at least one coupler photon disposed in the coupler.

At 1406, the controller mediates interaction of two defects via a virtual photon in a coupler proximate to the two defects. The controller could, in response to executing processor-executable instructions, direct the input subsystem to couple the first defect and the second defect via a virtual photon disposed in the coupler. For example, the first defect and the second defect interact via a vacuum state of the coupler.

At 1408, the controller couples two defects via an intermediate transition. For example, a coupler includes a transition that is selectively in resonance with transitions in the first and second defect. The controller may cause an input subsystem to bring a first transition for a first defect, a second transition for a second defect, and the third intermediate coupler transition into near resonance. Method 1400 ends until invoked again.

Further implementations are summarized in the following examples.

Example 1. A device including a body of semiconductor material consisting principally of silicon, one or more local defects disposed in the semiconductor substrate, and one or more carriers associated with the one or more local defects. A respective carrier included in the one or more carriers is associated with a respective local defect included in the one or more local defects, and the respective carrier has a respective first state and a respective second state. The respective first state and the respective second state are separated by a respective optical transition modified by a local degree of freedom.

Example 2. The device of example 1, further including one or more optical structures optically coupled to the one or more local defects. Each of the one or more optical structures can hold or direct a respective photon corresponding to the respective optical transition modified by a local degree of freedom.

Example 3. The device of example 2 where the one or more optical structures includes a waveguide, a coupler, or a resonator.

Example 4. The devices of any of examples 1, 2, or 3 where the respective first state is a ground state and the second state is an excited state or the respective first state is an excited state and the second state is a ground state, and the respective first state is modified by the carrier spin, or the respective first state and the respective second state are modified by the carrier spin.

Example 5. The device of example 1, where a respective local defect of the one or more local defects disposed in the semiconductor substrate comprises a luminescence centre.

Example 6. The device of example 5, where the luminescence centre is a G-centre.

Example 7. The device of example 5, where the luminescence centre is selected from the group consisting of C-centre, and W-centre.

Example 8. The device of example 5, where the luminescence centre is selected from the group consisting of T-centre, I-centre, and M-centre.

Example 9. The device of example 8, where the T-centre selected from the group consisting of T-centre including a defect comprising an acceptor, Al1 defect, and Ga1 defect.

Example 10. The device of example 5, wherein the luminescence centre is selected from the group consisting of Q-centre, carbon and nitrogen centre, carbon and gallium centre, 805 meV centre, 811 meV centre and 488 meV centre.

Example 11. The devices of any of examples 1, 2, or 3, where a respective local defect of the one or more local defects disposed in the semiconductor substrate is shallow.

Example 12. The devices of any of examples 1, 2, or 3, further including an input subsystem coupled to the semiconductor substrate.

Example 13. The devices of any of examples 1, 2, or 3, further including an output subsystem coupled to the semiconductor substrate.

Unless otherwise specified herein, or unless the context clearly dictates otherwise the term about modifying a numerical quantity means plus or minus ten (10) percent. Unless otherwise specified, or unless the context dictates otherwise, between two numerical values is to be read as between and including the two numerical values.

In the above description, some specific details are included to provide an understanding of various disclosed implementations. One skilled in the relevant art, however, will recognize that implementations may be practiced without one or more of these specific details, parts of a method, components, materials, etc. In some instances, well-known structures associated with semiconductor and/or optical devices and/or quantum computing and/or quantum information processing, such as targets, substrates, lenses, waveguides, shields, filters, lasers, processor-executable instructions (e.g., BIOS, drivers), have not been shown or described in detail to avoid unnecessarily obscuring descriptions of the disclosed implementations.

In this specification and appended claims "a", "an", "one", or "another" applied to "embodiment", "example", or "implementation" is used in the sense that a particular referent feature, structure, or characteristic described in connection with the embodiment, example, or implementation is included in at least one embodiment, example, or implementation. Thus, phrases like "in one embodiment", "in an embodiment", or "another embodiment" are not necessarily all referring to the same embodiment. Furthermore, the particular features, structures, or characteristics may be combined in any suitable manner in one or more embodiments, examples, or implementations.

As used in this specification and the appended claims, the singular forms of articles, such as "a", "an", and "the", include plural referents unless the context mandates otherwise. It should also be noted that the term "or" is generally employed in its sense including "and/or" unless the context mandates otherwise.

Unless the context requires otherwise, throughout this specification and appended claims, the word "comprise" and variations thereof, such as, "comprises" and "comprising" are to be interpreted in an open, inclusive sense, that is, as "including, but not limited to". Unless the context requires otherwise, throughout this specification and appended claims, the words "consisting principally of" means including a majority of the referent components, materials, or parts; and the "consisting essentially of" means including the referent components, materials, or parts and others not materially affecting the characteristic(s) of the referent components, materials, or parts.

Unless the context requires otherwise, throughout this specification and appended claims, directions and relative arrangements are used for explanation of referent examples and other examples could have alternative directions or arrangements. Thus terms like "up", "down", "above", "below", "left", "right", "overlie", and "underlie" can be read as including the meaning of opposite terms. Unless the context requires otherwise, throughout this specification and appended claims, relative arrangement of operations or acts are provided for explanation and various acts may be performed in a different order than that illustrated and described.

All of the US patents, US patent application publications, US patent applications, foreign patents, foreign patent applications, and non-patent publications referred to in this specification, or referred to on any application data sheet are incorporated by reference in their entireties for all purposes herein. This includes commonly assigned WO patent application publication no. WO 2017089891 A1 filed Nov. 25, 2016 and U.S. provisional patent application No. 62/676,023 filed May 24, 2018 and application No. 62/703,689 filed Jul. 26, 2018.

While certain features of the described embodiments and implementations have been described herein, many modifications, substitutions, changes and equivalents will now occur to those skilled in the art. It is, therefore, to be understood that the appended claims are intended to cover all such modifications and changes as fall within the scope of the described embodiments and implementations.

The invention claimed is:

1. A device comprising:
a body of semiconductor material consisting principally of silicon;
one or more luminescence centres disposed in the body of semiconductor material, each of the one or more luminescence centres comprising a defect selected from the group consisting of: T-center, Al1 defect, and Ga1 defect;
one or more optical degrees of freedom associated with the one or more luminescence centres;
one or more local degrees of freedom associated with each of the the one or more luminescence centres; and
one or more optical structures optically coupled to, a respective luminescence center of the one or more luminescence centres, the one or more optical structures comprising an optical resonator supporting one or more photonic modes,
wherein:
a respective local degree of freedom is associated with the respective luminescence centre,
the one or more local degrees of freedom of the respective luminescence centre modify the one or more optical degrees of freedom of the respective luminescence centre, and
the one or more optical structures are operable to receive photons corresponding to the one or more optical degrees of freedom of the respective luminescence centre as modified by the one or more local degrees of freedom of the respective luminescence centre.

2. The device of claim 1, further comprising:
one or more particles associated with the one or more luminescence centres,
wherein:
a respective particle of the one of the one or more particles is associated with a respective luminescence centre, and
the respective particle is selected from the group consisting of a carrier, a hole, an electron, and a nucleus.

3. The device of claim 1, further comprising:
one or more particles associated with the one or more luminescence centres,
wherein:
a respective particle of the one or more particles is associated with the respective luminescence centre, and
the one or more local degrees of freedom of the respective luminescence centre are at least partially defined by spin states of the respective particle.

4. The device of claim 1, further comprising a pair of electrodes operable to apply an electric field coupled to the one or more optical degrees of freedom or the one or more local degrees of freedom.

5. The device of claim 1, further comprising a photon detector coupled to the one or more optical degrees of freedom or the one or more local degrees of freedom.

6. The device of claim 1, wherein the respective luminescence centre is situated within the optical resonator, and the optical structure is operable to modify an emission property of the respective luminescence centre.

7. The device of claim 1 comprising a light source for selectively applying a near-resonant optical pulses to the one or more luminescence centres.

8. A method comprising:
modifying one or more optical degrees of freedom associated with a respective luminescence centre disposed in a body of semiconductor material consisting principally of silicon, the luminescence centre being a defect selected from the group consisting of: T-centre, Al1 defect, and Ga1 defect; and
causing one or more optical structures comprising an optical resonator supporting one or more photonic modes to receive a photon associated with the modified one or more optical degrees of freedom.

9. The method of claim 8, wherein the one or more optical degrees of freedom is modified by manipulating one or more local degrees of freedom associated with the respective luminescence centre.

10. The method of claim 9, wherein the one or more local degrees of freedom are at least partially defined by spin states of one or more particles associated with the respective luminescence centre.

11. The method of claim 10, wherein the one or more particles are selected from the group consisting of a hole, an electron, and a nucleus.

12. The device of claim 7 comprising an optical waveguide coupled to the light source, wherein the near-resonant optical pulse from the light source is delivered to the respective luminescence centre via the optical waveguide.

13. The method of claim 8 comprising causing the optical structure to modify an emission property of the respective luminescence centre.

14. The method of claim 8 comprising selectively applying one or more near-resonant optical pulses to the respective luminescence centre.

15. The method of claim 8 comprising determining a state of the respective luminescence centre based on an emitted photon that is associated with the modified one or more optical degrees of freedom.

* * * * *